US012771872B2

(12) United States Patent
Lee et al.

(10) Patent No.: US 12,771,872 B2
(45) Date of Patent: Oct. 20, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Sooyeon Lee, Seoul (KR); Hyejung Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/696,705

(22) PCT Filed: Sep. 7, 2022

(86) PCT No.: PCT/KR2022/013407
§ 371 (c)(1),
(2) Date: Mar. 28, 2024

(87) PCT Pub. No.: WO2023/054932
PCT Pub. Date: Apr. 6, 2023

(65) Prior Publication Data
US 2024/0397093 A1 Nov. 28, 2024

(30) Foreign Application Priority Data
Sep. 29, 2021 (KR) ........................ 10-2021-0128414

(51) Int. Cl.
*H04N 19/597* (2014.01)

(52) U.S. Cl.
CPC .................................. *H04N 19/597* (2014.11)

(58) Field of Classification Search
None
See application file for complete search history.

(56) References Cited

U.S. PATENT DOCUMENTS

2021/0192798 A1 6/2021 Lasserre et al.
2021/0217205 A1* 7/2021 Yea ........................ H04N 19/96
2021/0297698 A1* 9/2021 Sugio ...................... G06T 9/001
2022/0108487 A1* 4/2022 Cao ...................... H04N 19/597

FOREIGN PATENT DOCUMENTS

KR 10-2021-0057143 5/2021
KR 10-2021-0104055 8/2021
KR 10-2021-0117142 9/2021

OTHER PUBLICATIONS

International Search Report and Written Opinion in International Appln. No. PCT/KR2022/013407, mailed on Dec. 13, 2022, 16 pages (with English translation).
Kim et al., "3D Motion Estimation and Compensation Method for Video-Based Point Cloud Compression," IEEE Access, Apr. 30, 2020, 8:83538-83547.

(Continued)

*Primary Examiner* — Christopher Braniff
(74) *Attorney, Agent, or Firm* — Fish & Richardson P.C.

(57) ABSTRACT

A point cloud data transmission method according to embodiments may comprise the steps of: encoding point cloud data; and transmitting a bitstream including the point cloud data. A point cloud data reception method according to embodiments may comprise the steps of: receiving a bitstream including point cloud data; and decoding the point cloud data.

14 Claims, 26 Drawing Sheets

(a) (b)

(56) References Cited

OTHER PUBLICATIONS

Cao et al., "Compression of Sparse and Dense Dynamic Point Clouds-Methods and Standards," Proceedings of the IEEE, Jun. 2021, 109(9):1537-1558.
Extended European Search Report in European Appin. No. 22876707.5, mailed on Sep. 5, 2025, 11 pages.
Jin et al., "An Improved Coarse-to-Fine Motion Estimation Scheme for Lidar Point Cloud Geometry Compression," Paper, Presented at the 2021 IEEE International Conference on Multimedia & Expo Workshops (ICMEW), Shenzhen, China, Jul. 5-9, 2021, pp. 1-6.
Ximin et al., "Six dimensional clustering segmentation of color point cloud," Paper, Presented at the Proceedings of the International Conference on Audio, Language and Image Processing (ICALIP), Shanghai, China, Jul. 11-12, 2016, pp. 423-427.

* cited by examiner

FIG. 21

| | |
|---|---|
| seq_parameter_set_rbsp( ) { | |
| ... | |
| sps_attribute_MEMC_enable | |
| sps_MotionVector_continuation_enable | |
| if(sps_attribute_MEMC_enable) | |
| sps_PU_depth_level | |
| | |
| ... | |
| } | |

FIG. 22

| geometry_parameter_set( ) { | Descriptor |
|---|---|
| ... | |
| gps_attribute_MEMC_enable | u(1) |
| if(gps_attribute_MEMC_enable){ | |
| MEMC_threshold | ue(v) |
| grouping_num_points | ue(v) |
| grouping_domain_flag | u(1) |
| } | |
| ... | |
| } | |

FIG. 23

| attribute_parameter_set( ) { | Descriptor |
|---|---|
| ... | |
| aps_attribute_MEMC_enable | u(1) |
| if(aps_attribute_MEMC_enable){ | |
| aps_MotionVector_continuation_enable | u(1) |
| if(!aps_MotionVector_continuation_enable){ | |
| aps_MEMC_threshold | ue(v) |
| aps_grouping_num_points | ue(v) |
| aps_grouping_domain_flag | u(1) |
| } | |
| ... | |
| } | |
| } | |

FIG. 24

| Struct PUtree( ) { | Descriptor |
|---|---|
| ... | |
| popul_flags | u(1) |
| split_flags | u(1) |
| isWorld | u(1) |
| | |
| num_anchor | ue(v) |
| for(i=0;i<num_anchor;i++){ | |
| MV[i] | se(v) |
| group_index[i] | ue(v) |
| anchor_position[i] | se(v) |
| group_threshold[i] | ue(v) |
| } | |
| ... | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2022/013407, filed on Sep. 7, 2022, which claims the benefit of Korean Application No. 10-2021-0128414, filed on Sep. 29, 2021. The disclosures of the prior applications are incorporated by reference in their entirety.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method of transmitting point cloud data may include encoding point cloud data, and transmitting a bitstream containing the point cloud data. In another aspect of the present disclosure, a method of receiving point cloud data may include receiving a bitstream containing point cloud data, and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 21 illustrates a sequence parameter set according to embodiments;

FIG. 22 illustrates a geometry parameter set according to embodiments;

FIG. 23 illustrates an attribute parameter set according to embodiments;

FIG. 24 illustrates a PU structure according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
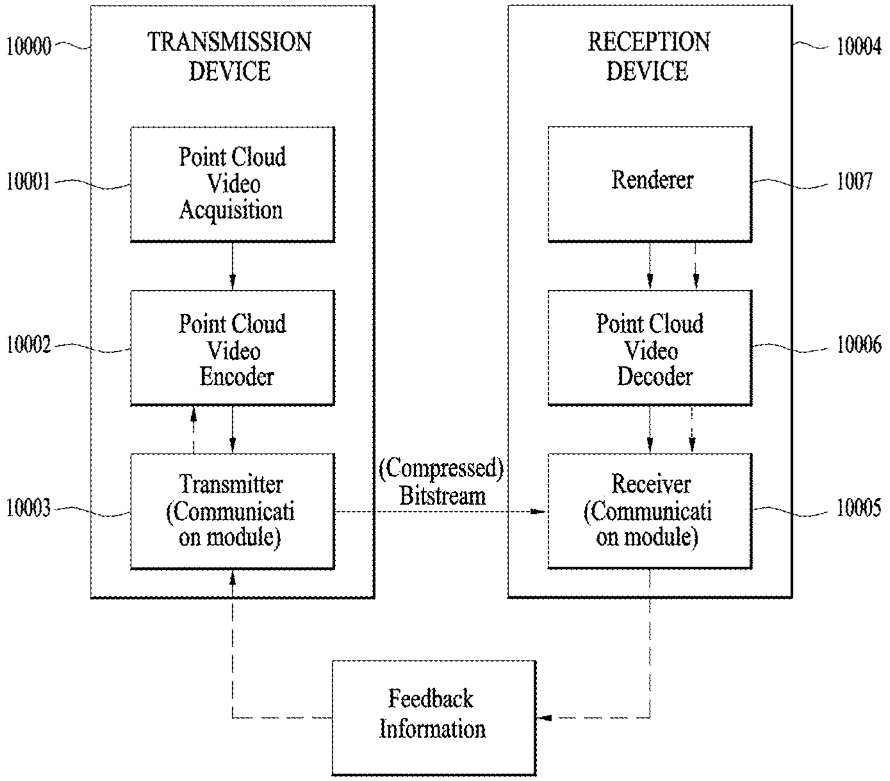
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process of the operation of the point cloud video encoder 10002). Accordingly, the point cloud video decoder 10006 may decode the point cloud video data by performing point cloud decompression coding, which is the reverse process to the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
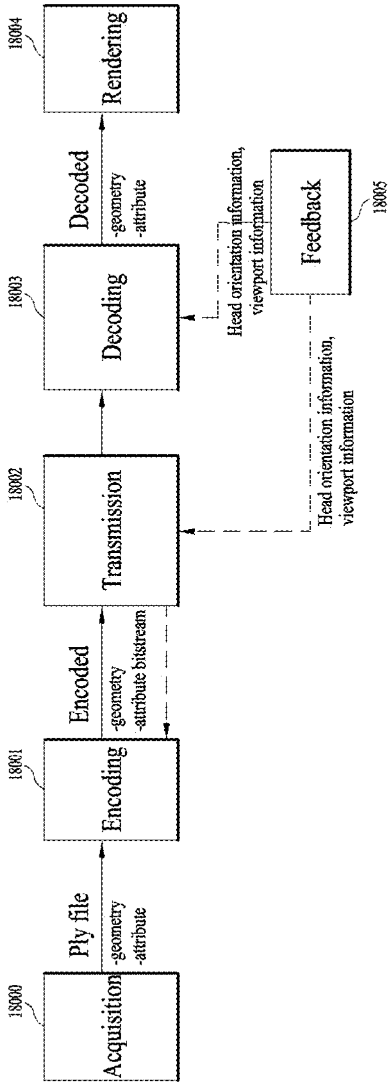
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (e.g., the point cloud transmission device 10000 or the point cloud video acquirer 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
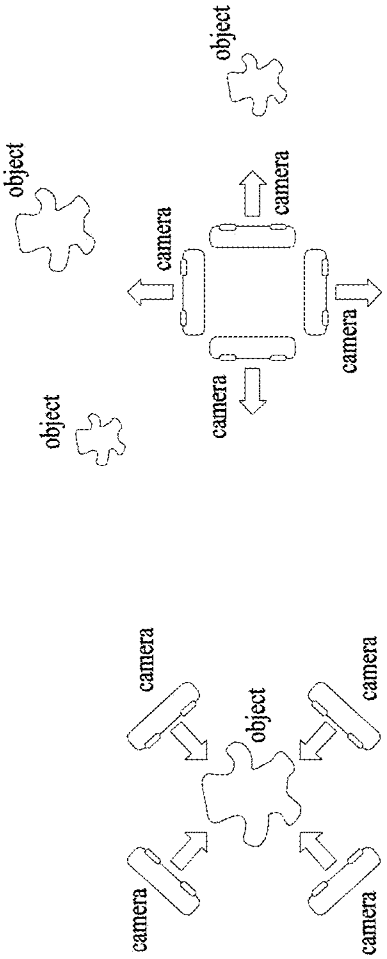
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
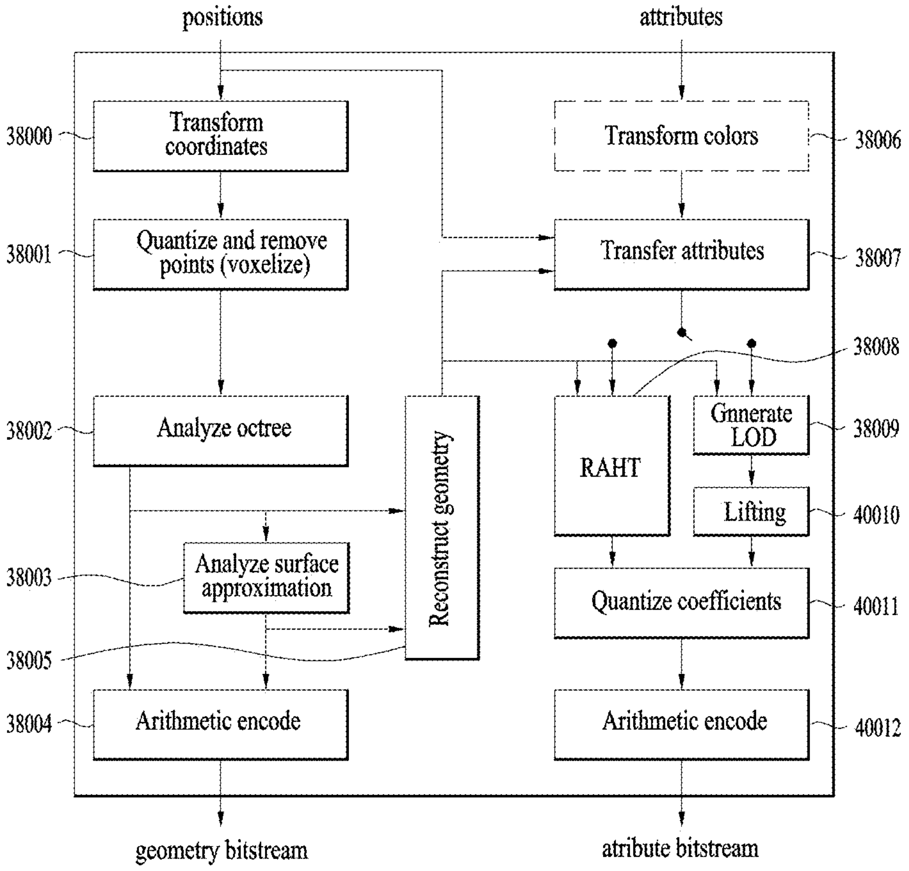
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) may be performed quickly. The Morton code is generated by presenting coordinates (e.g., (x,y,z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
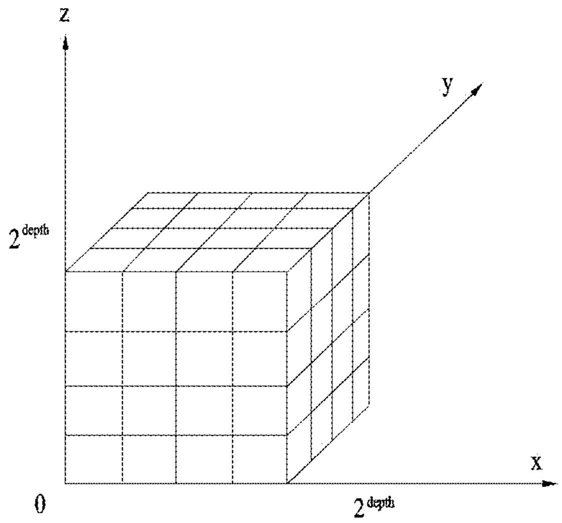
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
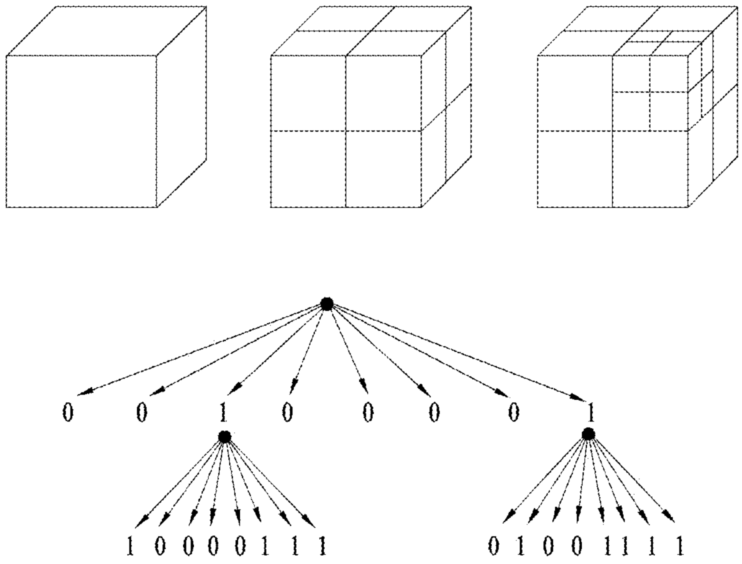
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (e.g., the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d = Ceil\left(\text{Log2}\left(\text{Max}\left(x_n^{int}, y_n^{int}, z_n^{int}, n = 1, \ldots, N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (e.g., the arithmetic encoder 40004) according to the embodiments may perform entropy encoding on the occupancy codes. In order to increase the compression efficiency, the point cloud encoder may perform intra/inter-coding on the occupancy codes. The reception device (e.g., the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. E.g., when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x,y,z) of the edge, the direction vector (Δx, Δy, Δz) of the edge, and the vertex position value (relative position value within the edge). When the trisoup geometry encoding is applied, the point cloud encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n}\sum_{i=1}^{n}\begin{bmatrix} x_i \\ y_i \\ z_i \end{bmatrix}; \qquad \text{i)}$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \qquad \text{ii)}$$

$$\begin{bmatrix} \sigma_x^2 \\ \sigma_y^2 \\ \sigma_z^2 \end{bmatrix} = \sum_{i=1}^{n}\begin{bmatrix} \overline{x}_i^2 \\ \overline{y}_i^2 \\ \overline{z}_i^2 \end{bmatrix} \qquad \text{iii)}$$

The minimum value of the sum is estimated, and the projection process is performed according to the axis with the minimum value. For example, when the element x is the minimum, each vertex is projected on the x-axis with respect to the center of the block, and projected on the (y,z) plane. When the values obtained through projection on the (y,z) plane are (ai, bi), the value of 0 is estimated through atan2 (bi, ai), and the vertices are ordered based on the value of 0. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1 Triangles formed from vertices ordered 1, . . . ,n n triangles
3 (1,2,3)
4 (1,2,3), (3,4,1)
5 (1,2,3), (3,4,5), (5,1,3)
6 (1,2,3), (3,4,5), (5,6,1), (1,3,5)
7 (1,2,3), (3,4,5), (5,6,7), (7,1,3), (3,5,7)
8 (1,2,3), (3,4,5), (5,6,7), (7,8,1), (1,3,5), (5,7,1)
9 (1,2,3), (3,4,5), (5,6,7), (7,8,9), (9,1,3), (3,5,7), (7,9,3)
10 (1,2,3), (3,4,5), (5,6,7), (7,8,9), (9,10,1), (1,3,5), (5,7,9), (9,1,5)
11 (1,2,3), (3,4,5), (5,6,7), (7,8,9), (9,10,11), (11,1,3), (3,5,7), (7,9,11), (11,3,7)
12 (1,2,3), (3,4,5), (5,6,7), (7,8,9), (9,10,11), (11,12,1), (1,3,5), (5,7,9), (9,11,1), (1,5,9)

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

Figure 7:
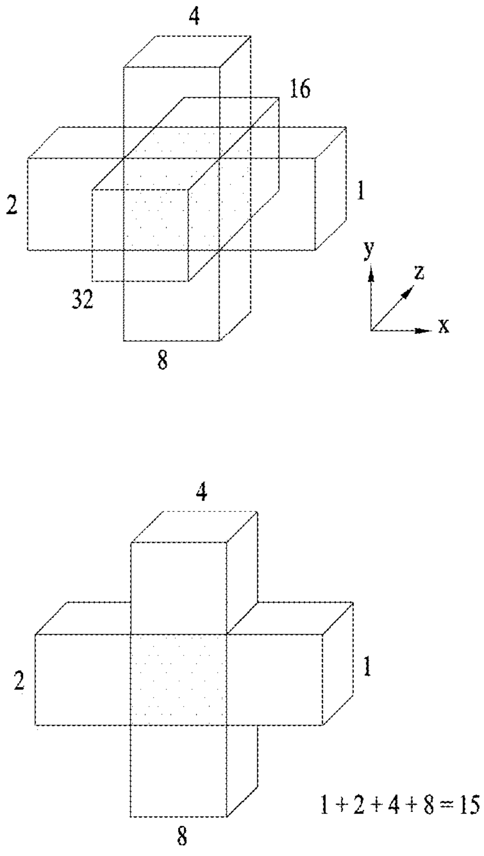
FIG. 7 shows an example of a neighbor node pattern according to embodiments.

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
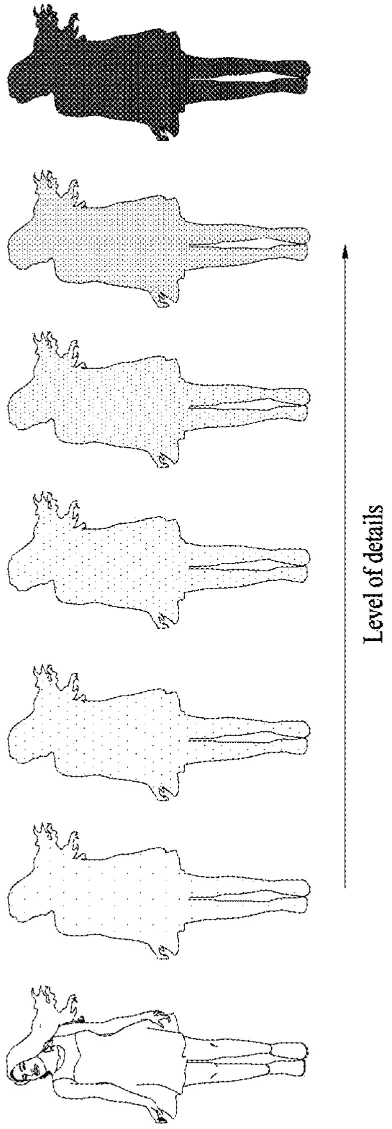
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (e.g., the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
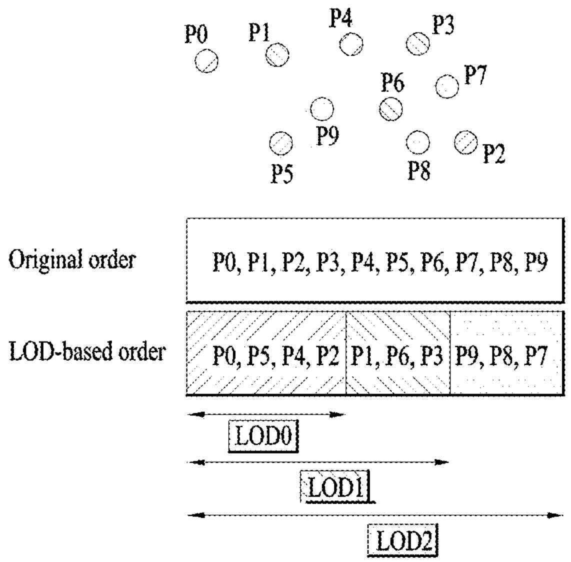
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (e.g., the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (e.g., the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

| Attribute prediction residuals quantization pseudo code |
|---|
| int PCCQuantization(int value, int quantStep) {<br>if( value >=0) {<br>return floor(value / quantStep + 1.0 / 3.0);<br>} else {<br>return −floor(−value / quantStep + 1.0 / 3.0);<br>}<br>} |

TABLE

| Attribute prediction residuals inverse quantization pseudo code |
|---|
| int PCCInverseQuantization(int value, int quantStep) {<br>if( quantStep ==0) {<br>return value;<br>} else {<br>return value * quantStep;<br>}<br>} |

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (e.g., the arithmetic encoder 40012) may perform entropy coding on the attributes of the corresponding point without performing the above-described operation.

The point cloud encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.
2) Lift prediction process: Subtract the value obtained by multiplying the attribute value of the point by the weight from the existing attribute value to calculate a predicted attribute value.
3) Create temporary arrays called updateweight and update and initialize the temporary arrays to zero.
4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.
5) Lift update process: Divide the attribute values of the update array for all predictors by the weight value of the updateweight array of the predictor index, and add the existing attribute value to the values obtained by the division.
6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000\,w1001} \begin{bmatrix} g_{1_{0,0,0z}} \\ g_{1_{0,0,1}} \end{bmatrix}$$

Figure 10:
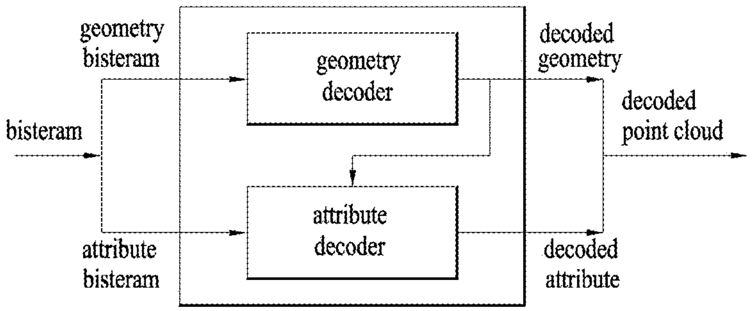
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
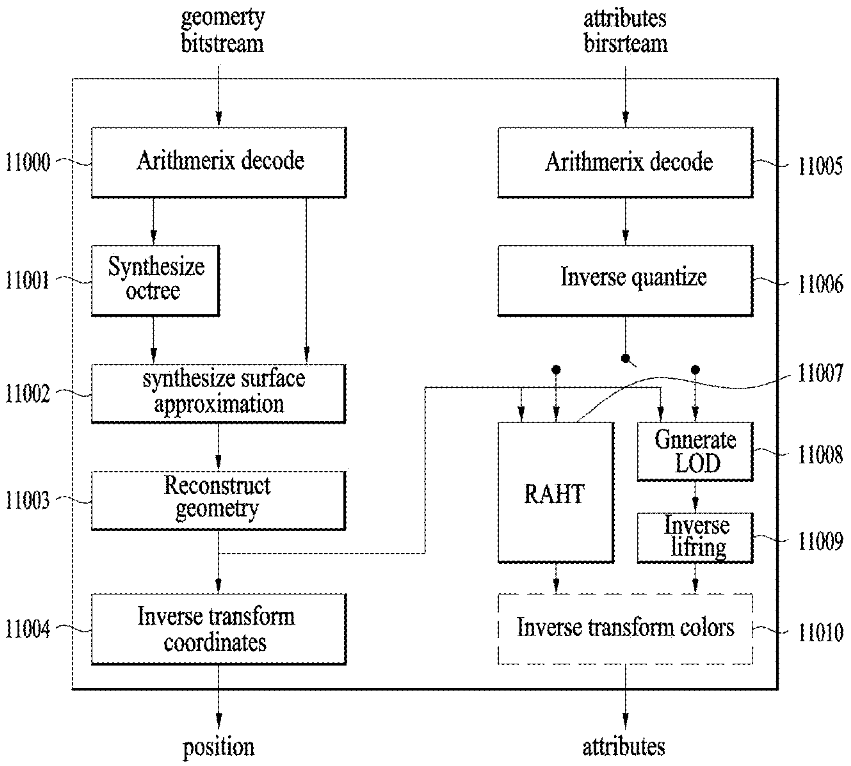
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process to the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as a reverse process to the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the reverse process to the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
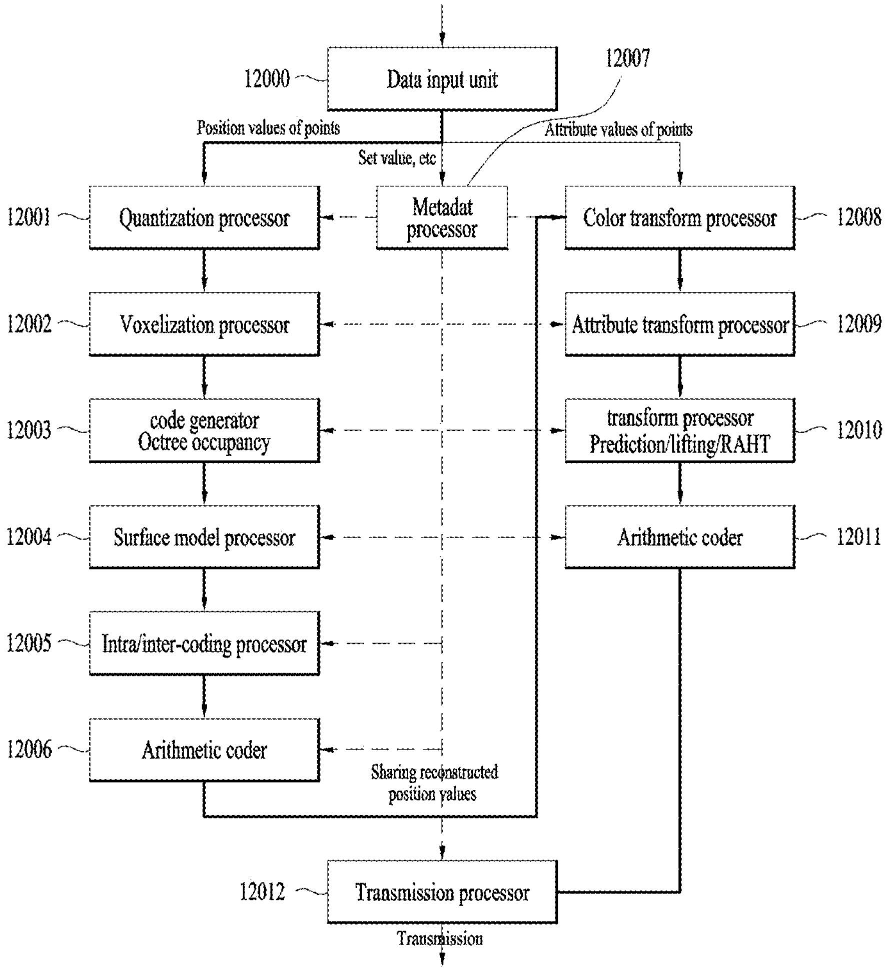
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
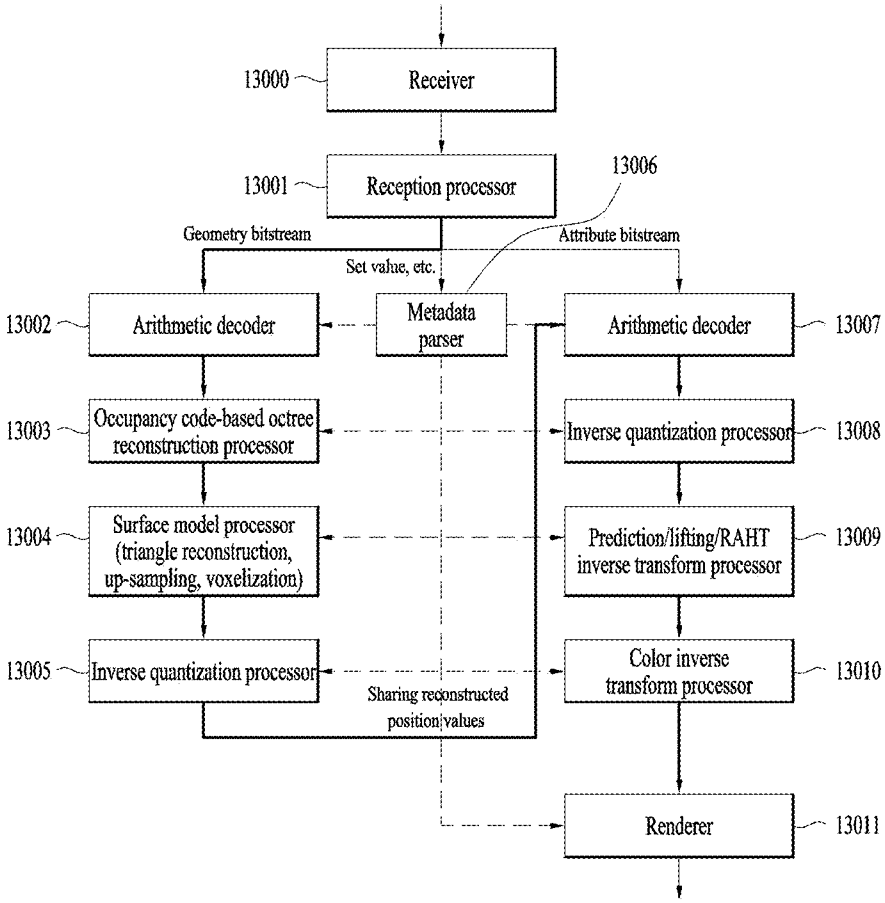
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process to the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
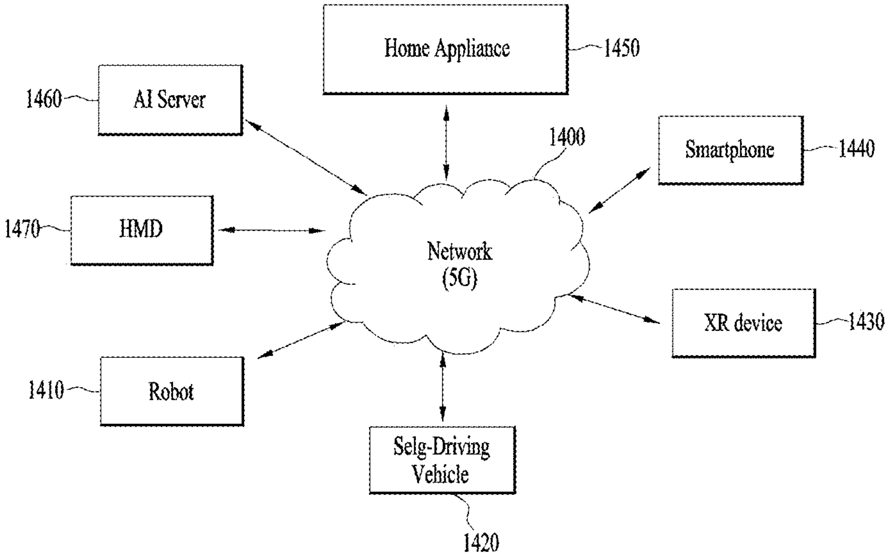
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 27:
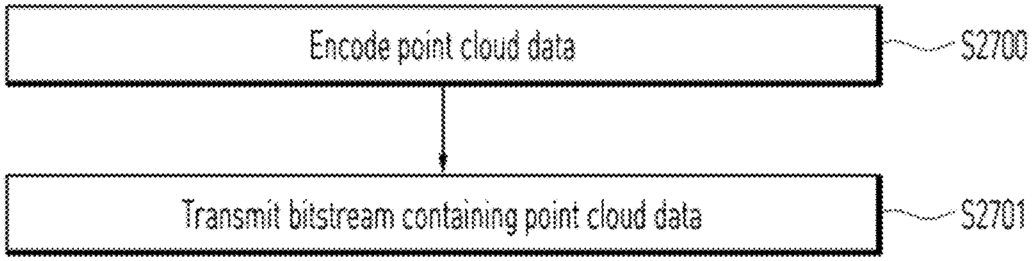
FIG. 27 illustrates a point cloud data transmission method according to embodiments.

The point cloud data transmission method/device according to embodiments is construed as a term referring to the transmission device 10000, point cloud video encoder 10002, and transmitter 10003 of FIG. 1, the acquisition 20000/encoding 20001/transmission 20002 of FIG. 2, the encoder of FIG. 4, the transmission device of FIG. 12, the device of FIG. 14, the encoding of FIGS. 15 to 19, the bitstream generation of FIGS. 20 to 24, the encoding of FIG. 25, the transmission method of FIG. 27, and the like.

Figure 26:
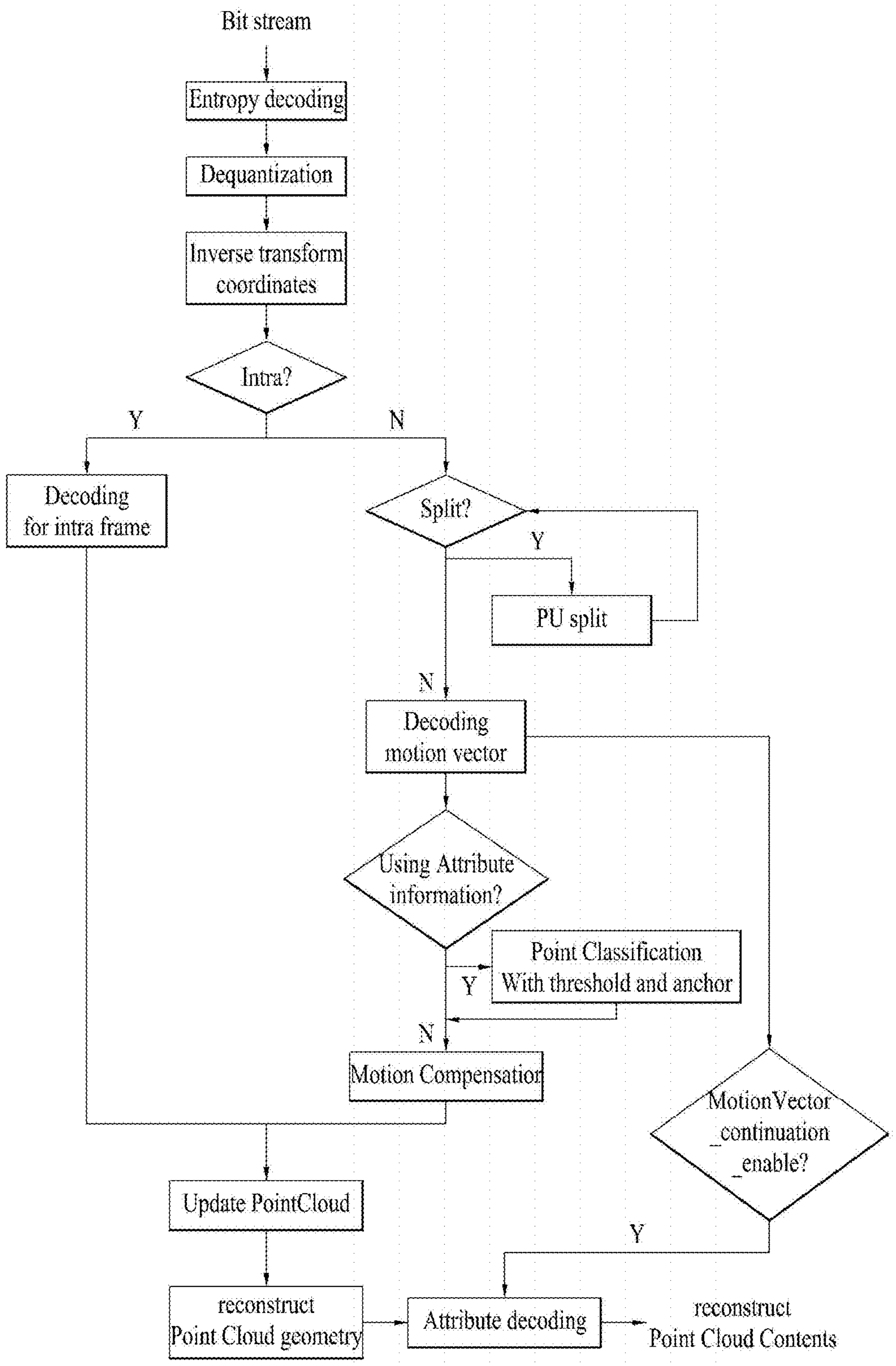
FIG. 26 illustrates a point cloud data reception device according to embodiments.
Figure 28:
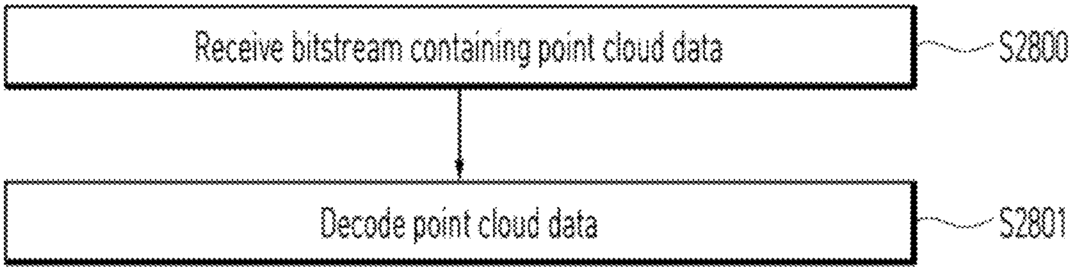
FIG. 28 illustrates a point cloud data reception method according to embodiments.

The point cloud data reception method/device according to embodiments is construed as a term referring to the reception device 10004, receiver 10005, and point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoding of FIGS. 15 to 19, the bitstream parsing of FIGS. 20 to 24, the encoding of FIG. 26, the reception method of FIG. 28, and the like.

The point cloud data transmission/reception method/device according to the embodiments may be referred to as a method/device according to the embodiments for short.

According to embodiments, geometry data, geometry information, position information, and the like constituting the point cloud data are construed as having the same meaning. Attribute data, attribute information, and the like constituting point cloud data are construed as having the same meaning.

Embodiments may include a method for motion vector estimation using attribute information.

The method/device according to the embodiments may include and carry out a method for motion vector estimation using attribute information about a point contained in a PU/CU/TU/slice/tile/brick/frame to apply a inter-frame prediction technique as a method for increasing compression efficiency of point cloud data having one or more frames.

A PU/CU/TU/slice/tile/brick/frame according to the embodiments is a unit containing point cloud data and refers to an encoding and decoding unit.

PU is a prediction unit, TU is a transform unit, and CU is a coding unit. A slice may be split into tiles, bricks, subpictures, etc. A CU may be split into PUs, TUs, etc. A frame refers to a frame containing point cloud data.

A method/device according to embodiments includes operations for compressing and reconstructing data composed of a point cloud. Specifically, motion vector estimation, which is one of inter prediction techniques, may be provided for effective compression and reconstruction of a point cloud having one or more frames.

In the method applied to perform motion estimation in the inter prediction (EM) technique, there is an LUT consisting of a minimum of 6 and a maximum of 26 unit vectors in different directions, and the vector difference of a point that is the target of motion estimation is used to find the best motion vector that should be added to obtain a point in the current frame. Then, motion compensation is performed with the best motion vector.

For the information about the unit vectors defined in the LUT, the smallest vector LUT consisting of 6 vectors that may be obtained by rotating about each axis by 90° or the largest vector LUT consisting of 26 unit vectors defined by a searching pattern and forming 45° in all directions may be applied. The LUT is not adaptively applied differently according to the situation. Rather, the LUT should be manually replaced according to the user's needs. The advantage of this searching pattern is that the estimation may be performed repeatedly to find a motion vector by varying the amount of motion applied in a predetermined search direction. However, for each target vector-scale factor x searching pattern, the scale factor x searching pattern with the smallest difference is searched for, and the scale factor is repeatedly adjusted to find the nearest motion vector. In other words, G-PCC does not reflect the data distribution when performing ME/MC, but includes all points in the PU for motion vector estimation. If the difference between the points included in the search window and the PU is excessively large, the points are excluded from ME/MC. However, as the geometry and attribute information are separated and processed as separate information, the conventional method raises the following issue. If points belong to the same prediction unit when only geometry is considered, the motion vector is searched considering only the distance based on the same PU unit even if the actual attribute information is completely different.

Figure 15:
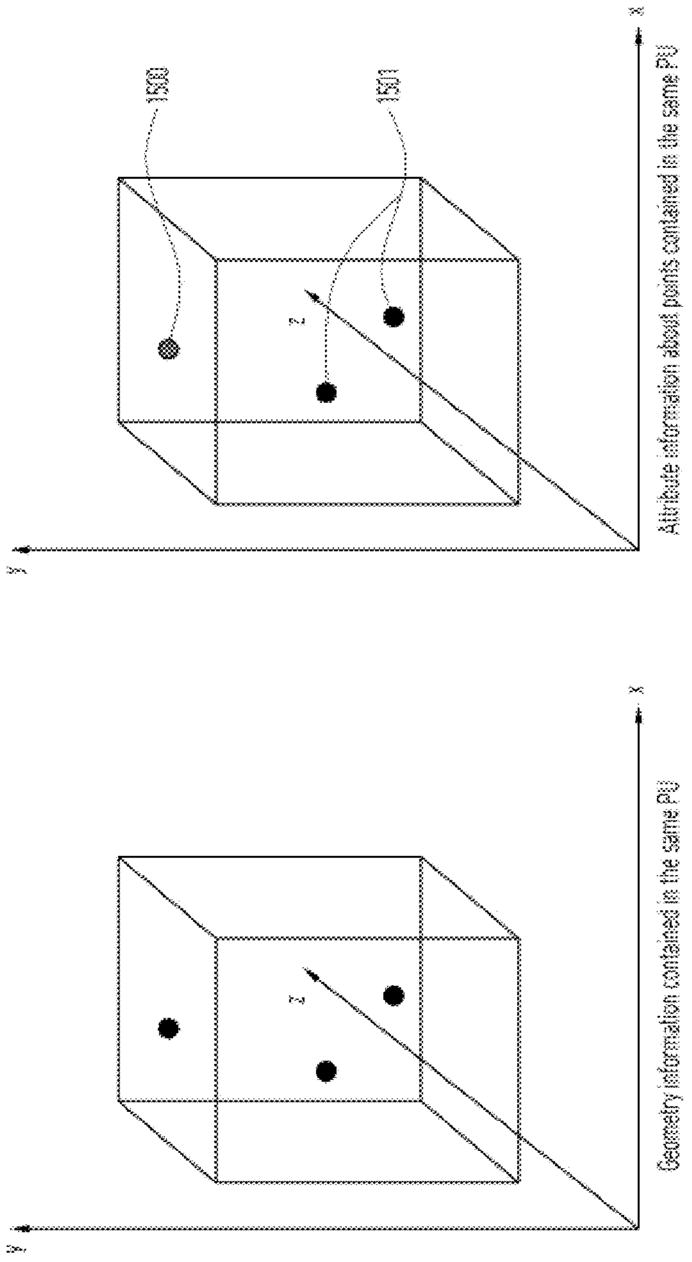
FIG. 15 illustrates geometry information and attribute information in the same PU according to embodiments.

FIG. 15 illustrates geometry information and attribute information in the same PU according to embodiments.

FIG. 15 illustrates an example of a PU and the distribution of points in the PU that are utilized by a point cloud data transmission/reception method/device to perform inter-prediction according to embodiments.

For example, a PU may include three points. Each of the three points may have geometry information (geometry data and position values of the points). The three points may be contained in different objects. In other words, point 1500 and point 1501 may be contained in different objects and have different attribute information (attribute data and attributes). It is more efficient and accurate to apply motion estimation based on the object units of the actual points, rather than estimating the motion of point 1500 and point 1501 as a single PU.

Only the case where three points are included in a PU has been described as an example. In a case where multiple points belong to one PU and constitute an object, different object information may be mixed. In this case, objects exhibiting different motions are considered as one prediction unit for motion vector estimation. Thus, the method of motion vector estimation that further considers attribute information in local motion estimation according to embodiments may effectively address these issues and limitations.

In some embodiments, in classifying the point cloud data into PUs by a point cloud data transmission/reception device, 67.

For example, motion vector estimation may be performed considering geometry and attributes. Outliers among the candidates for motion vector estimation may be removed or processed separately based on attribute information related to the reference frame. Motion vector information found in the geometry may be inherited in attribute coding. The points of a PU that have been preliminarily classified based on geometry may be separated by attribute information. Criteria for removing outliers or applying a conventional method may be applied when the points having a value less than or equal to a specific value in the same PU have different attribute information than the majority of points. Attribute information may be included as the same object or PU information only when it has the same value or has a difference less than or equal to a specific value. Even when the points are classified by attribute information, the conventional method may be applied if there is no change from the classification based on geometry, or if the number of points classified by attribute information is less than a predetermined number.

Figure 16:
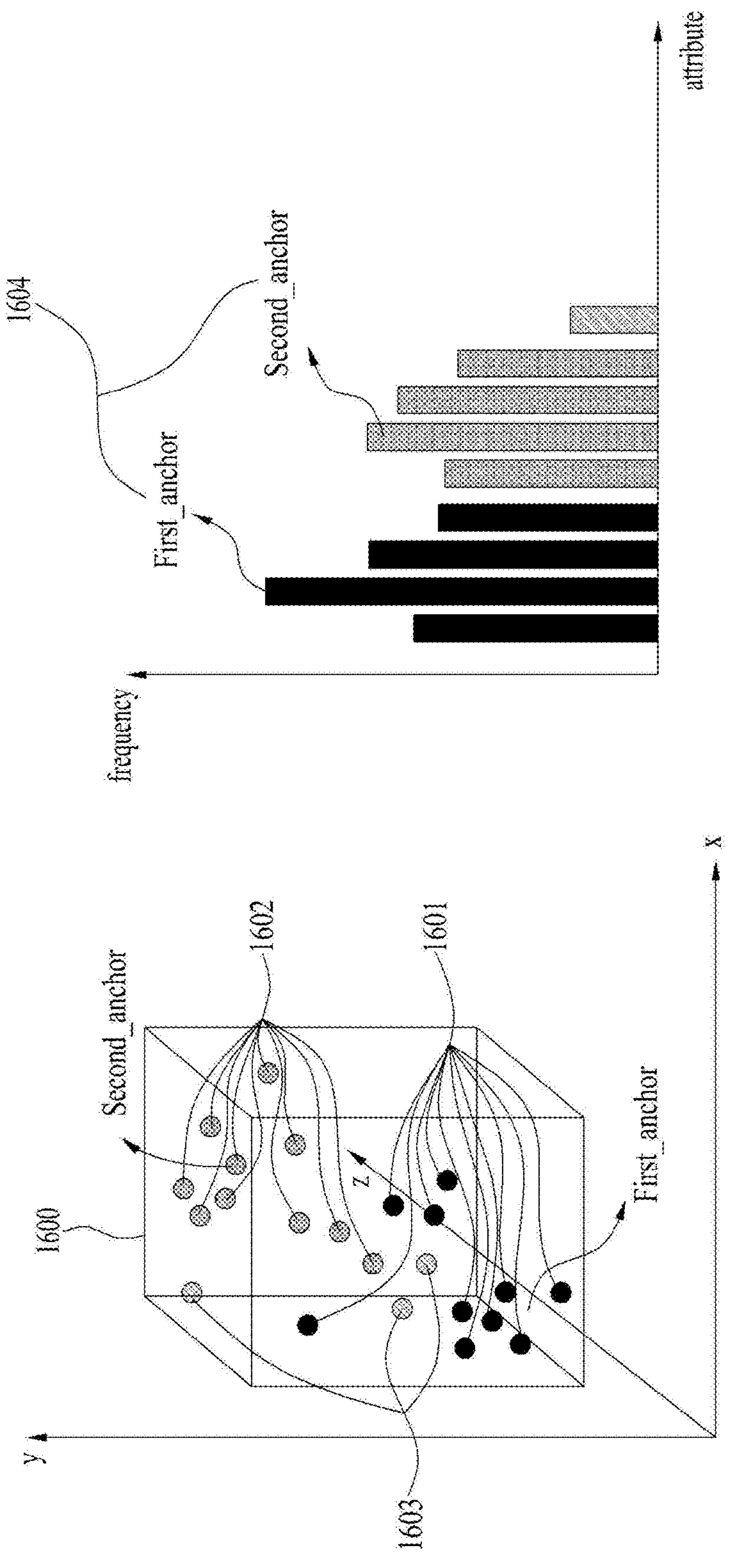
FIG. 16 illustrates a method of classifying points and selecting a threshold according to embodiments.

FIG. 16 illustrates a method of classifying points and selecting a threshold according to embodiments.

The point cloud transmission/reception device according to the embodiments may classify points and select a reference value for motion vector estimation.

Referring to FIG. 16, points in the same PU may be categorized into three attribute groups based on attribute values. As shown in FIG. 16, a histogram may be generated according to the range of attribute values to show the data distribution. Additional methods may be applied to group points in a PU based on the criteria described later.

To classify point positions based on attribute values, the bin of the histogram with the highest frequency is found, and the median, mode, or average of the bin is selected as a reference value (group_anchor_attr) to classify the first geometry group. Depending on the coverage of the anchor value, the method may be divided into the following two methods: 1) unstructured and 2) structured.

To classify points after selecting the anchor value, points that fall within a specific range of attribute values from the reference value (group_anchor_attr) may be grouped.

Points that fall within the specific range of attribute values from the point position having the same or closest attribute information to the reference value (group_anchor_attr) may be categorized into a group.

Referring to FIG. 16, one and the same PU may include points, and the points may be categorized based on attribute values. For example, when the attribute is the color of points, points 1601 with the attribute blue, points 1602 with the attribute yellow, and points 1603 with the attribute green may be distributed according to their frequency.

To select a reference value (anchor value) for grouping, the anchor value may be selected based on the most frequent attribute in the group of points with the same attribute. A first anchor value and a second anchor value 1604 may each be selected according to the distribution of points, as shown in FIG. 16.

Figure 17:
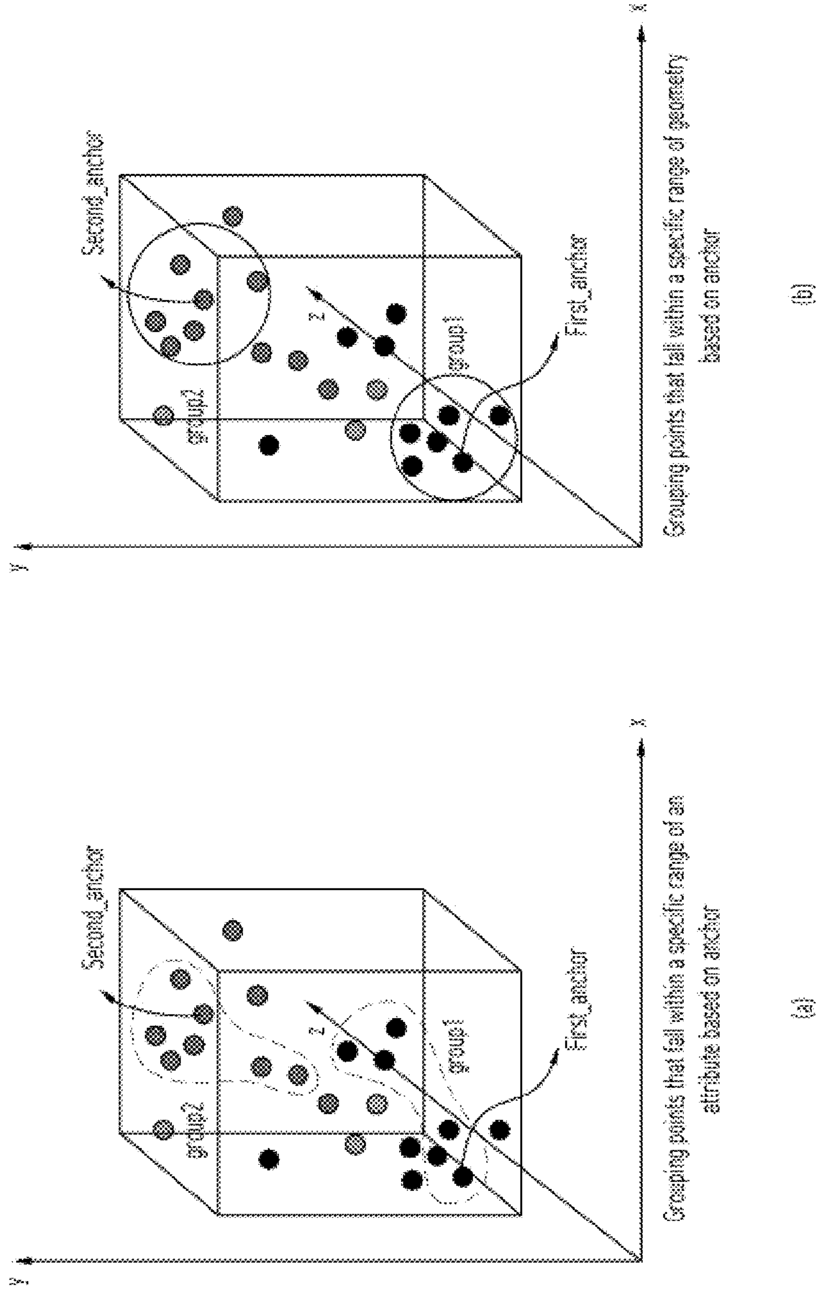
FIG. 17 illustrates a method of grouping points according to embodiments.

FIG. 17 illustrates a method of grouping points according to embodiments.

The method/device according to the embodiments may select a reference value in FIG. 16 and group points according to the reference value, as shown in FIG. 17.

Based on the reference value (anchor), the method of grouping points may be carried out based on the shape of the region. The region may have 1) an irregular shape, and/or 2) a regular shape.

In the first case, when point positions are classified based on a specific range of attribute values, grouping points in the PU space into a group causes points present in a region of an irregular shape to be grouped together.

In the second case, when grouping points that fall within a specific range based on a point that has a reference attribute value, points contained in a relatively regular region may be bundled into a group.

Referring to FIG. 17-(*a*), as described above, when points that fall within a specific range of attribute values are grouped based on a first reference value (first anchor), the region of the grouped points may be irregular. For each of the first anchor and second anchor, a first group, a second group, or the like may be generated.

Referring to FIG. 17-(*b*), as described above, when the points included in a specific range of geometry values are grouped based on the first reference value (first anchor), the region of the grouped points may have a regular shape, such as a circle or the like. For each of the first anchor and the second anchor, a first group, a second group, or the like may be generated.

Figure 18:
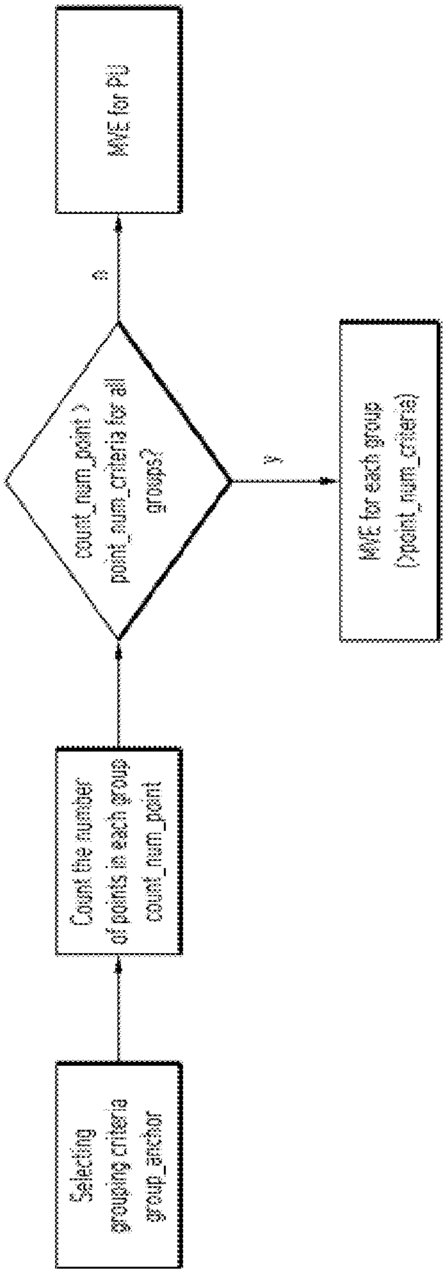
FIG. 18 illustrates a method for motion vector estimation according to embodiments.

FIG. 18 illustrates a method for motion vector estimation according to embodiments.

The method/device according to the embodiments may group points and apply motion vector estimation to the group, as shown in FIG. 17.

The method for performing motion vector estimation (MVE) considering attribute information may be extended as shown in FIG. 17.

To classify the points in a PU into separate groups, an anchor may be selected from the histogram generated based on the attribute (see FIG. 16, etc.) and the number of groups may be determined. If, after grouping (see FIG. 17, etc.), the number of points in each group is less than a threshold, a method that does not utilize the attribute information may be used. If, after grouping, the number of points in a particular group is greater than a specific number, only that group may be considered for motion vector estimation, and the rest of the points may be excluded from motion vector estimation.

Since points may be reclassified into one or more groups in the same PU, a method for selecting the center of the group or the value on which the classification is based may be required. Depending on the selection method, the number of reference values (group_anchor) may represent the number of groups in the same PU, and that information may be transmitted to the receiver.

In the method for selecting group_anchor, the attribute information is divided into uniform ranges, as shown in FIG. 16, and the frequency of each range is counted based on the attribute to represent a histogram, and the range with the highest frequency is registered as the anchor of the first group. Points that fall within a predefined or calculated threshold range centered on the anchor of the first group are registered as elements of the group. If the number of registered points is greater than point_num_criteria, the group is targeted for motion vector estimation (MVE). If the number of points in the group is less than point_num_criteria, the anchor information and the information about the points in the group may be discarded. If the number of points included in the first group is less than point_num_criteria and the number of points not included in the first group is less than point_num_criteria, the processing method for the PU may not be based on the attribute information. When the first group is the only group available for MVE, the MVE may only be performed on the points that are included in the first group. If the number of points not included in the first group is greater than point_num_criteria, a second anchor needs to be selected. In this case, a histogram centered on the points not included in the first group is re-generated, the mean, median, and/or mode of the bin with the highest frequency is determined as the anchor for the second group and is registered as the group_anchor for the second group. In the same way the points around the anchor in the first group are grouped to determine whether they are available for MVE, points around the second group anchor (group_anchor) among the points that belong to the same PU and are not included in the first group are grouped and it is checked whether they are available for MVE. If the number of points in the group is greater than point_num_criteria, MVE is performed on the second group. By repeating this process, points having different attribute distributions within the same PU may be separated by grouping and independent MVE may be performed thereon.

Just as this process is performed in the current frame to group points with different attribute distributions in the same PU, points that fall within a PU and search window threshold-based range (PU+search_window_threshold) may also be grouped in the reference frame. The same group_anchor information as the current frame may be received, or the group_anchor information found in the search window may be parsed to the current frame. By grouping neighbor points around each element in the group_anchor list, which is the classification criteria for each group, and determining whether the group is the target of MVE based on the number of points included in the group, MVE may be performed on the group that is the target of MVE. For points that do not belong to a separate group in the search window of the reference frame, MVE may be performed based on position information alone without attribute information, and calculation operations may be performed by weighted summation of motion vector information obtained as a result of the MVE.

Referring to FIG. 18, the encoding and/or decoding operation in the method of transmitting and/or receiving point cloud data according to the embodiments may include selecting a group classification criterion (setting an anchor), acquiring the number of points in each group, comparing the number of points in each group with a reference number of points, performing attribute-based MVE for each group when the number of points in each group is greater than the reference number, and performing MVE for a PU when the number of points in each group is less than the reference number.

Figure 19:
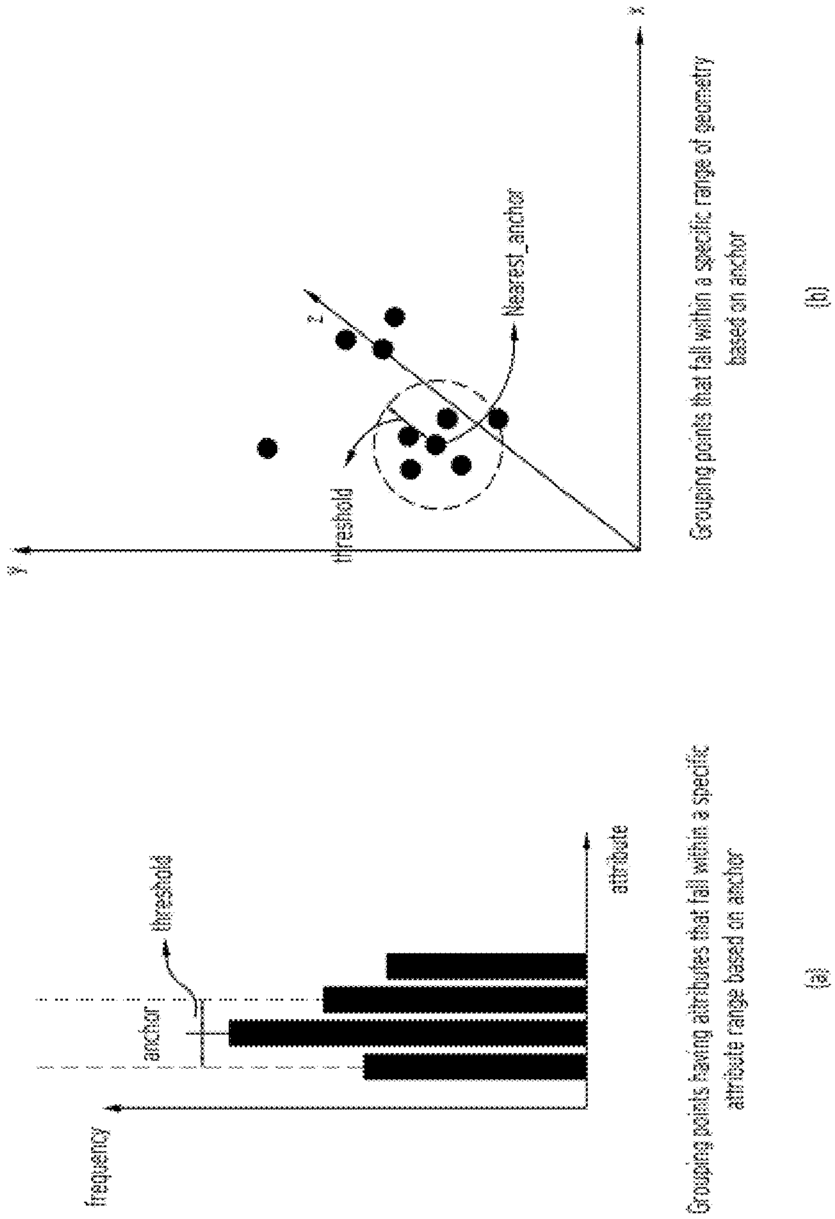
FIG. 19 illustrates a point grouping method according to embodiments.

FIG. 19 illustrates a point grouping method according to embodiments.

FIG. 19 illustrates the point grouping method described in FIG. 17 in more detail.

The method/device according to the embodiments may determine whether point are included in a group as follows.

Method 1: If an anchor is set based on an attribute of points and then the points that are included within a specific range from the reference point (anchor) are to be classified into a group, attribute information that falls within a threshold range (+/−threshold) based on the attribute information corresponding to the anchor may be included in the group, and the geometry information about the included points is returned to be classified as one group.

Method 2: Geometry information with positions that fall within a threshold range (+/−threshold) based on the geometry information with the closest attribute to the attribute corresponding to the anchor may be classified into one group.

When attribute values are grouped based on the attribute information corresponding to the anchor and then the corresponding position value is returned, additional procedures may be required depending on whether the attribute information is color or reflectance, or whether the attribute information is one-dimensional or three-dimensional. When the attribute information is one-dimensional, or when it is reflectance, the points are separated into one group if the simple difference between the reflectance of the anchor and the other reflectance is less than a threshold. When the attribute information is three-dimensional, the three-dimensional distance between the attribute information about the anchor and the attribute information about neighbor points, such as the Euclidean or manhattan distance, may be calculated to create a single value, and then the points are separated into one group if the value is less than the threshold. The points may be separated based on a value less than the threshold. However, in the case where the attribute information is one-dimensional, the points may be separated into one group if the corresponding attribute information falls within a min/max range that sets the range.

If neighbor points are classified according to a specific reference based on the position information (nearest anchor) that is attribute information corresponding to or nearest the attribute information about the anchor and then points are classified into one group (which may be called setting, generation, or the like), the distance between the nearest anchor and the other points may be calculated, and then points whose distance is less than a threshold may be separated into the same group.

The threshold may be pre-specified and delivered. Alternatively, it may be calculated and applied on the system, considering the distribution in a specific range (+/−nSigma) based on the anchor. In addition, N points may be selected from among the points positioned in a specific range (+/−) with respect to the anchor.

The motion vector found on the geometry may be inherited and applied when inter prediction is performed on the attribute.

The size of the PU may be octree split up to a specific level and then not split after grouping, wherein the level may be specified. The level may be generated as signaling information (parameter) and passed to the decoder.

Referring to FIG. 19-(*a*), an anchor may be set based on the values and frequencies of attributes of points according to embodiments, and groups of points, such as a first group and a second group, may be generated based on a threshold. Groups of points may be generated based on a range of attribute values. Points in a group may have attribute values that fall within a specific range. In Referring to FIG. 19-(*b*), an anchor may be set based on values and frequencies of attributes of points according to embodiments, and a group of points may be generated for positions around the anchor based on a threshold. The points in the group may have geometry values (positions) that fall within a specific range. In space along the xyz axes, points belonging to a specific region (space) may be generated as a group.

Figure 20:
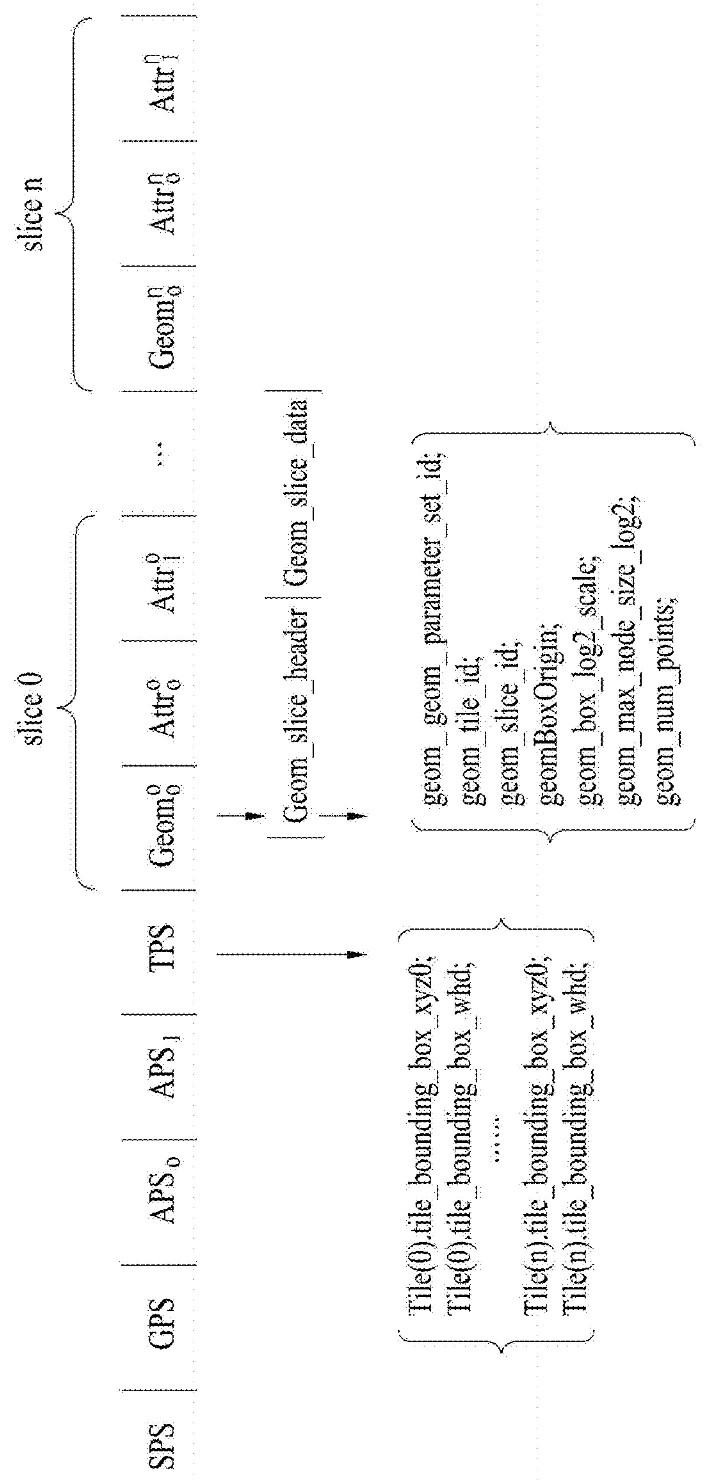
FIG. 20 illustrates a bitstream containing point cloud data according to embodiments.

FIG. 20 illustrates a bitstream containing point cloud data according to embodiments.

A method/device for transmitting point cloud data according to embodiments (i.e., the transmission device 10000, point cloud video encoder 10002, and transmitter 10003 of FIG. 1, the acquisition 20000/encoding 20001/transmission 20002 of FIG. 2, the encoder of FIG. 4, the transmission device of FIG. 12, the device of FIG. 14, the encoding of FIGS. 15 to 19, the bitstream generation of FIGS. 20 to 24, the encoding of FIG. 25, the transmission method of FIG. 27, and a corresponding processor) may encode point cloud data as described above, generate encoding-related signaling information (or parameters), and transmit a bitstream containing the data and the information as shown in FIG. 20.

A method/device for receiving point cloud data according to embodiments (i.e., the reception device 10004, receiver 10005, and point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoding of FIGS. 15 to 19, the bitstream parsing of FIGS. 20 to 24, the encoding of FIG. 26, the reception method of FIG. 28, and a corresponding processor) may receive a bitstream as shown in FIG. 20, parse the bitstream, and decode the point cloud data in the bitstream based on parameters in the bitstream using the methods described above.

The syntax and semantics of the information contained in the bitstream are described with reference to FIGS. 20 to 24.

As shown in FIGS. 20 to 24, points may be classified based on attribute information about the points contained in the same prediction unit and a method for predicting motion related to the points may be signaled.

Based on the search window and the attribute information about the prediction unit, points belonging to the same PU and search window may be grouped, each group may be separated, and information for motion vector estimation may be generated as follows. In motion prediction and compensation, A sequence parameter set described below may inform (indicate) method may indicate that the points have been separated based on the attribute information, and all or part of the information relevant to the sequence parameter set may be delivered according to the implementation method required for the information. Furthermore, corresponding information may be carried in a geometry parameter set, a slice header (which may correspond to a data unit header), an SEI message, or the like. In addition, the information may be defined in corresponding or separate positions depending on the application, system, or the like to provide different scopes and methods of application. Additionally, when the syntax elements defined below are applicable not only to the current point cloud data stream but also to multiple point cloud data streams, necessary information may be carried in a higher-level parameter set or the like.

Relevant information may be signaled in order to carry out the embodiments. Hereinafter, parameters (which may be referred to as metadata, signaling information, etc.) according to embodiments may be generated by a process of a transmitter according to embodiments and delivered to a receiver according to embodiments for use in the reconstruction of a point cloud. For example, the parameters according to the embodiments may be generated in a metadata processor (or metadata generator) of the transmission device according to the embodiments described below and acquired by a metadata parser of the reception device according to the embodiments.

Configuration of an encoded point cloud is described with reference to FIGS. 20 to 24, Abbreviations used herein are: SPS: Sequence Parameter Set; GPS: Geometry Parameter Set; APS: Attribute Parameter Set; TPS: Tile Parameter Set; Geom (which may also be referred to as geometry information, geometry data, geometry, etc): Geometry bitstream=geometry slice header+geometry slice data (where the geometry slice header may be referred to as a geometry data unit header, and the geometry slice data may be referred to as the data (payload) of the geometry data unit); Attr (which may be referred to as attribute information, attribute data, attributes, etc.): Attribute bitstream=attribute slice header+attribute slice data (where the attribute slice header may be referred to as the header of the attribute data unit, and the attribute slice data may be referred to as the data (payload) of the attribute data unit).

The bitstream according to the embodiments provides slices such that the point cloud may be divided into regions and processed. When the point cloud is divided into regions, each region may have a different importance. By providing regions such that different filters and different filter units may be applied according to the importance, a filtering method having high complexity but good result quality may be used in an important region. By applying different filtering to the respective regions (regions partitioned into tiles or slices) according to the receiver capacity, rather than applying a complex filtering method to the entire point cloud data. Therefore, better image quality may be ensured in a region important to the user and an appropriate latency may be ensured in the system. Accordingly, when a point cloud is partitioned into tiles, different filters or different filter units may be applied to the respective tiles. When the point cloud is divided into slices, different filters or different filter units may be applied to the respective slices.

Referring to FIG. 20, the bitstream may include SPS, GPS, APS, TPS, and TPS. There may be a plurality of APSs. The TPS may include information about tile bounding boxes for a plurality of tiles. For example, it may include position (coordinate) information, size information (width, depth, height), etc. about the bounding box of a tile. The bitstream may contain geometry information (data) and attribute information (data) on a per-slice (data unit) basis. Because point cloud data is encoded on a per-slice (data unit) basis, the bitstream may contain a plurality of slices (data units). A slice (data unit) may include geometry information (position) and one or more pieces of attribute information (color, reflectance, etc.) about one point. For example, slice (data unit) 0 may include geometry data, and the geometry data may include a geometry slice header and geometry slice data. The geometry slice header may contain information about the geometry. For example, it may contain information such as geometry parameter set ID, geometry tile ID, geometry slice ID, the origin of a box (bounding box) containing the geometry, logarithmic scale of the box, the maximum node size, and the number of points.

FIG. 21 illustrates a sequence parameter set according to embodiments.

FIG. 21 illustrates an SPS contained in the bitstream of FIG. 20. As shown in FIG. 21, the SPS may carry information related to motion estimation (ME) and motion compensation (MC) reflecting attribute information.

The syntax of the ME/MC related information according to embodiments is configured as follows.

sps_attribute_MEMC_enable: A flag indicating whether to perform grouping and ME/MC per group in consideration of the attribute information about points included in the motion vector estimation unit in motion vector estimation and motion vector compensation. When sps_attribute_MEMC_enable is True, it may indicate that the motion vector estimation method that considers the attribute information about the points is applied. When the flag is False, it may indicate that the motion vector estimation/compensation is performed using a search pattern without considering the attribute information.

sps_MotionVector_continuation_enable: A flag indicating whether the results of motion vector estimation on geometry should be inherited and applied to motion estimation on attributes, or whether separate motion vector estimation should be performed for geometry and attributes. When sps_MotionVector_continuation_enable is True, it may indicate that the same motion vector is applied to geometry and attributes. When the flag is false, it may indicate that the motion vector estimation process for geometry and attributes is handled separately.

sps_PU_depth_level: If the points in a PU are grouped based on attribute information, i.e., if sps_attribute_MEMC_enable is True, sps_PU_depth_level may signal the final depth level at which the PU is split into cubic or rectangular PUs. sps_PU_depth_level is higher than the depth level of the leaf node and lower than the depth level of the root node.

The sequence parameter set may further contain the following elements.

simple_profile_compatibility_flag: simple profile_compatibility_flag equal to 1 specifies that the bitstream conforms to a simple profile. simple_profile_compatibility_flag equal to 0 specifies that the bitstream conforms to a profile other than the simple profile.

dense_profile_compatibility_flag: When equal to 1, it specifies that the bitstream conforms to a Dense profile. density_profile_compatibility_flag equal to 0 specifies that the bitstream conforms to a profile other than the Dense profile.

predictive_profile_compatibility_flag: When equal to 1, it specifies that the bitstream conforms to a predictive profile. predictive_profile_compatibility_flag equal to 0 specifies that the bitstream conforms to a profile other than the predictive profile.

main_profile_compatibility_flag: When equal to 1, it specifies that the bitstream conforms to the main profile. main_profile_compatibility_flag equal to 0 specifies that the bitstream conforms to a profile other than the main profile.

reserved_profile_compatibility_18 bits: Shall be equal to 0 in bitstreams conforming to this version of this document. Other values for reserved_profile_compatibility_18 bits are reserved for future use by ISO/IEC. The decoder shall ignore the value of reserved_profile_compatibility_18 bits.

slice_reordering_constraint_flag: When equal to 1, it indicates that the bitstream is sensitive to reordering and removal of data units. slice_reordering_constraint_flag equal to 0 indicates that the bitstream is insensitive to reordering and removal of data units.

unique_point_positions_constraint_flag: When equal to 1, it indicates that all output points have unique positions in each point cloud frame that references the current SPS. unique_point_positions_constraint_flag equal to 0 indicates that two or more output points may have the same position in any point cloud frame that references the current SPS.

level_idc: Indicates the level to which the bitstream conforms as specified in Annex A. The bitstream shall not contain any value of level_idc other than the values specified in Annex A. Other values of level_idc are reserved for future use by ISO/IEC.

sps_seq_parameter_set_id: Provides an identifier for the SPS such that it may be referenced by other syntax elements. sps_seq_parameter_set_id shall be 0 in bitstreams that conform to this version of this document. Other values of sps_seq_parameter_set_id are reserved for future use by ISO/IEC.

frame_ctr_lsb_bits: Specifies the length of the syntax element frame_ctr_lsb in bits.

slice_tag_bits: Specifies the length of the syntax element slice_tag in bits.

seq_origin_bits: Specifies the length of the syntax element seq_origin_xyz[k] in bits.

seq_origin_xyz[k] and seq_origin_log 2_scale: Specify the origin of the sequence local coordinate system. The index k is the k-th X, Y, or Z component of the origin coordinates. When not present, the values of seq_origin_xyz[k] and seq_origin_log 2_scale are inferred to be 0.

The array SeqOrigin is the origin of the sequence local coordinate system:

SeqOrigin[k]=seq_origin_xyz[k]<<seq_origin_log 2_scale seq_bounding_box_size_bits: The length of the syntax element seq_bounding_box_size_minus1_xyz[k] in bits.

seq_bounding_box_size_xyz_minus1[k] plus 1 specifies the k-th component of the width, height, and depth of the coded volume dimensions in the output coordinate system, respectively. When not present, the coded volume dimensions are undefined.

seq_unit_numerator_minus1, seq_unit_denominator_minus1, and seq_unit_in_metres_flag: Specify the lengths of the X, Y, and Z unit vectors in the output coordinate system.

seq_global_scale_factor_log 2, seq_global_scale_refinement_num_bits, and seq_global_scale_refinement_factor: Specify a fixed decimal scale factor used to derive output point positions from positions in the sequence local coordinate system.

seq_global_scale_factor_log 2: Used to derive a global scale factor to apply to the positions in the point cloud.

seq_global_scale_refinement_num_bits: The length of the syntax element seq_global_scale_refinement_factor in bits. When seq_global_refinement_num_bits is equal to 0, no segmentation is applied.

seq_global_scale_refinement_factor: Specifies the refinement for the global scale value. When not present, seq_global_scale_refinement_factor is inferred to be equal to 0.

sps_num_attributes: Specifies the number of attributes in the coded point cloud. It is a requirement of bitstream conformance that every slice has an attribute data unit corresponding to every attribute component listed in the SPS.

attribute_dimension_minus1[attrId] plus 1 specifies the number of components of the attrId-th attribute.

attribute_instance_id[attrId]: Specifies the instance identifier for the attrId-th attribute.

attribute_bitdepth_minus1[attrId] plus 1 specifies the bit depth of each component of the attrId-th attribute signal(s).

known_attribute_label_flag[attrId], known_attribute_label[attrId], and attribute_label_oid[attrId]: Identify the type of data passed in the attrId-th attribute. known_attribute_label_flag[attrId] indicates whether the attribute is identified by the value of known_attribute_label[attrId] or by the object identifier attribute_label_oid[attrId].

The attribute type identified by known_attribute_label may be specified. When the value of known_attribute_label is unspecified, it is reserved for future use by ISO/IEC.

The attribute type identified by attribute_label_oid is not specified in this document. attribute_label_oid is in Recommendation ITU-T X.660|ISO/IEC 9834-1.

The attribute type may indicate Colour, Reflectance, Opacity, Frame index, Frame number, Material identifier, Normal vector, etc.

num_attribute_parameters: Specifies the number of attribute parameter sets in the bitstream. The attribute parameters that are signaled in the sequence parameter set are applied to all data units in the coded point cloud sequence.

axis_coding_order: Specifies the correspondence between the X, Y, and Z output axis labels and the three position components of all points in the reconstructed point cloud.

bypass_stream_enabled_flag equal to 1 specifies that bypass coding mode may be used when reading the bitstream. bypass_stream_enabled_flag equal to 0 specifies that bypass coding mode is not used when reading the bitstream.

entropy_continuation_enabled_flag equal to 1 indicates that the initial entropy context state of a slice may depend on the final entropy context state of the preceding slice. entropy_continuation_enabled_flag equal to 0 specifies that the initial entropy context state of each slice is independent. entropy_continuation_enabled_flag being equal to 0 when slice_reordering_constaint_flag is equal to 0 is a requirement of bitstream conformance.

sps_extension_flag equal to 0 specifies that the syntax element sps_extension_data_flag is not present in the SPS syntax structure. sps_extension_flag shall be equal to 0 in bitstreams that conform to this version of this document. The value 1 for sps_extension_flag is reserved for future use by ISO/IEC. The decoder shall ignore any syntax elements sps_extension_data_flag that follow the value of 1 for sps_extension_flag in the SPS syntax structure.

sps_extension_data_flag may have any value. Its presence and value does not affect decoder conformance to the profiles specified in Annex A. Decoders conforming to this version of this document shall ignore all syntax elements sps_extension_data_flag.

FIG. 22 illustrates a geometry parameter set according to embodiments.

FIG. 22 illustrates a geometry parameter set contained in the bitstream of FIG. 20. As shown in FIG. 22, the GPS may carry ME/MC information reflecting attribute information. The ME/MC information reflecting attribute information may be added to the GPS and signaled.

gps_attribute_MEMC_enable: A flag indicating whether to perform grouping in consideration of the attribute information about points included in the motion vector estimation unit in motion vector estimation and motion vector compensation. Necessary information may be declared in the GPS for signaling on a frame-by-frame basis. When gps_attribute_MEMC_enable is True, it may indicate that the motion vector estimation method is applied after after point grouping considering attribute information. When the flag is False, it may indicate that the motion vector estimation/compensation is performed using a search pattern.

If a flag for attribute_MEMC_enable is present in the SPS, gps_attribute_MEMC_enable may be signaled with the corresponding information. When the flag is not present in the SPS, whether to apply gps_attribute_MEMC_enable may be signaled differently per GPS.

MEMC_threshold: When gps_attribute_MEMC_enable is True, namely, when motion vector estimation is performed after grouping in consideration of the attribute information about the points included in the PU, the range of points from the center anchor point to be included in one group may be signaled. The threshold information may be simply the number of points, or may be an internally calculated value within an nSigma range centered on the anchor. It may be an input value. It may be a value that is passed to the decoder. It may be a predetermined value in the system that is simply a number with the concept of distance. This value may be inherited in attribute motion vector estimation when sps_MotionVector_continuation_enable is True.

grouping_num_points: May signal a reference value forming the basis of determining whether to perform separate motion vector estimation for each group of points classified into a group. When the number of points positioned within MEME_threshold is less than grouping_num_points, motion vector estimation using a search pattern may be performed.

grouping_domain_flag: In grouping, the flag may signal whether the grouping is based on an attribute value or a position value of geometry. When grouping_domain_flag is True, it may indicate that the search is performed based on the position of the geometry. When the flag is False, it may indicate that the grouping is performed based on an attribute value of the attribute. Conversely, the flag may signal the indication based on attribute information when it is True, and based on position information when it is False.

The GPS may further contain the following information. gps_geom_parameter_set_id identifies the GPS for other DUs to reference.

gps_seq_parameter_set_id identifies the active SPS with sps_seq_parameter_set_id.

slice_geom_origin_scale_present specifies whether slice_geom_origin_log 2_scale is present (if 1) or absent (if 0) in the GDU header. slice_geom_origin_scale_present equal to 0 indicates that the slice origin scale is specified by gps_geom_origin_log 2_scale.

gps_geom_origin_log 2_scale specifies the scale factor used to derive the slice origin from slice_geom_origin_xyz when slice_geom_origin_scale_present is equal to 0.

geom_dup_point_counts_enabled specifies whether duplicate points can be signaled in the GDU by duplicate counts per point (when equal to 1) or not (when equal to 0).

geom_dup_point_counts_enabled equal to 0 does not prohibit coding the same point position multiple times within a single slice through means other than the syntax element direct_dup_point_cnt, occ_dup_point_cnt, or ptn_dup_point_cnt.

geom_tree_type equal to 0 specifies that the slice geometry is coded using an occupancy tree (7.3.3.4). geom_tree_type equal to 1 indicates that the slice geometry is coded using a predictive tree (7.3.3.8).

gps_extension_present indicates that the syntax element gps_extension_data is present (when equal to 1) or absent (when equal to 0) in the GPS syntax structure.

gps_extension_present is 0 in bitstreams that conform to this version of this document.

gps_extension_data may have any value. Its presence and value does not affect decoder conformance to the profiles specified in this version of this document. The decoder may ignore all syntax elements gps_extension_data.

geom_angular_enabled indicates that slice geometry is coded (when equal to 1) or not (when equal to 0) based on information about a beam set positioned and rotated along the V axis of the angle origin. When geom_angular_enabled is enabled, point positions are assumed to be sampled along the rays projected by the beams.

slice_angular_origin present specifies that the slice-related angular origin is signaled in the GDU header (when equal to 1) or not (when equal to 0). slice_angular_origin_present equal to 0 indicates that the angular origin is gps_angular_origin_xyz. When not present, slice_angular_origin_present is inferred to be 0.

gps_angular_origin_bits_minus1 plus 1 indicates the length of each syntax element gps_angular_origin_xyz in bits.

gps_angular_origin_xyz[ ] indicates the-th XYZ coordinates of the angular origin in the coding coordinate system.

num_beams_minus1 plus 1 indicates the number of beams listed by GPS.

beam_elevation_init and beam_elevation_diff[ ] together indicate the beam elevation as a slope above the S-T plane. The elevation slope of the-th beam is indicateed by the expression BeamElev[ ]. This is a binary fixed-point value with 18 decimal bits.

beam_voffset_init and beam_voffset_diff[ ] together indicate the V-axis offset of the listed beams from the angular origin. The offset is specified in units of the coding coordinate system. The offset of the-th beam is specified by the expression BeamOffsetV[ ].

beam_steps_per_rotation_init_minus1 and beam_steps_per_rotation_diff[ ] indicate the number of steps taken per rotation by the rotating beam. The value for the-th beam is specified by the expression BeamStepsPerRev[ ].

ptree_ang_azimuth_pi_bits_minus11 plus 11 indicates the number of bits indicating half a rotation of the beam around the V axis. Half the rotation is π radians.

ptree_ang_radius_scale_log 2 indicates the factor used to scale the radial angular coordinates of a point during the transformation to Cartesian coordinates.

ptree_ang_azimuth_step_minus1 plus 1 indicates the expected change in azimuth of a beam rotating between the coded points. The azimuth prediction residual used for coding the angle prediction tree may be coded as a multiple of ptree_ang_azimuth_step_minus1+1 and the remainder.

occtree_point_cnt_list_present indicates that the GDU footer lists the number of points at each occupancy tree level (when equal to 1) or not (when equal to 0). When not present, occtree_point_cnt_list_present is inferred to be 0.

occtree_direct_coding_mode greater than 0 indicates that the point position may be coded by an appropriate direct node in the occupancy tree. occtree_direct_coding_mode equal to 0 indicates that the direct node should not be present in the occupancy tree.

As the value of occtree_direct_coding_mode increases, the rate of direct node qualification generally increases.

occtree_direct_joint_coding_enabled indicates that a direct node for coding two points should jointly code positions (when equal to 1) or not (when equal to 0) according to a specific ordering of the points.

occtree_coded_axis_list_present equal to 1 indicates that the GDU header contains the syntax element occtree_coded_axis, which is used to derive the node size for each occupancy tree level. occtree_coded_axis_list_present equal to 0 indicates that the syntax element occtree_coded_axis is not present in the GDU syntax and that the occupancy tree indicates a three-dimensional volume specified by the tree depth.

occtree_neigh_window_log 2_minus1 plus 1 indicates the number of occupancy tree node postitions that form each availability window within the tree level. Nodes outside the window are not available in processes related to the nodes within the window.

occtree_neigh_window_log 2_minus1 equal to 0 indicates that only sibling nodes should be considered available to the current node.

occtree_adjacent_child_enabled indicates that an adjacent child of the adjacent occupancy tree node is used for bit occupancy contextualization (when equal to 1) or not (when equal to 0). When not present, occtree_adjacent_child_enabled is inferred to be 0.

occtree_intra_pred_max_nodesize_log 2 minus 1 indicates the maximum size of occupancy tree nodes suitable for in-slice occupancy prediction. When not present, occtree_intra_pred_max_nodesize_log 2 is inferred to be 0.

occtree_bitwise_coding indicates that the node occupancy bitmap is coded using a syntax element occupancy_bit (when equal to 1) or using a pre-coded syntax element occupancy_byte (when equal to 0).

occtree_planar_enabled indicates that the coding of the node occupancy bitmap is performed partially by signaling of occupied and unoccupied planes (when equal to 1) or not (when equal to 0). When not present, occtree_planar_enabled is inferred to be 0.

occtree_planar_threshold[ ] indicates the threshold used in part to determine axis-wise suitability for planar occupancy coding. The thresholds are specified from the most likely planar axis (=0) to the least likely axis (=2). Each threshold indicates the minimum likelihood of an eligible axis for which occ_single_plane is expected to be 1. The range [8, 120] for occtree_planar_threshold corresponds to the likelihood interval [0, 1).

When present, occtree_direct_node_rate_minus1 indicates that only occtree_direct_node_rate_minus1+1 nodes out of all 32 eligible nodes may be coded as direct nodes.

occtree_planar_buffer_disabled indicates that contextualization of per-node occupied planar positions using planar positions of previously coded nodes should be disabled (when equal to 1) or not (when equal to 0). When not present, occtree_planar_buffer_disabled is inferred to be 0.

geom_scaling_enabled indicates that the coded geometry should be scaled (when equal to 1) or not (when equal to 0) in the geometry decoding process.

geom_qp indicates the geometry QP before adding an offset per slice and per node.

geom_qp_mul_log 2 indicates the scaling factor to apply to the geometry QP. Exp2(3−geom_qp_mul_log 2) QP values are given every time the scaling step size is doubled.

ptree_qp_period_log 2 indicates the period at which the predictive tree node QP offset is signaled. The period is one for all Exp2(ptree_qp_period_log 2) nodes.

occtree_direct_node_qp_offset indicates the offset relative to the slice geometry QP for scaling direct node coded point positions.

FIG. 23 illustrates an attribute parameter set according to embodiments.

FIG. 23 illustrates an attribute parameter set contained in the bitstream of FIG. 20. As shown in FIG. 23, the APS may carry ME/MC information reflecting attribute information.

aps_attribute_MEMC_enable: A flag indicating whether to perform grouping in consideration of the attribute information about points included in the motion vector estimation unit in motion vector estimation and motion vector compensation. It may be declared in the APS for signaling on a frame-by-frame basis. When gps_attribute_MEMC_enable is True, it may indicate that the motion vector estimation method is applied after after point grouping considering attribute information. When the flag is False, it may indicate that the motion vector estimation/compensation is performed using a search pattern.

If a flag for attribute_MEMC_enable is present in the SPS, gps_attribute_MEMC_enable may be signaled with the corresponding information. When the flag is not present in the SPS, whether to apply aps_attribute_MEMC_enable may be signaled differently per GPS.

aps_MotionVector_continuation_enable: A flag indicating, when aps_attribute_MEMC_enable is true, whether the results of motion vector estimation on geometry should be inherited and applied to motion estimation on attributes, or whether separate motion vector estimation should be performed for geometry and attributes. When sps_MotionVector_continuation_enable is True, it may indicate that aps_attribute_MEMC_enable is true, and that the same motion vector is applied to geometry and attributes. When the flag is false, it may indicate that the motion vector estimation process for geometry and attributes is handled separately.

aps_MEMC_threshold: When aps_attribute_MEMC_enable is False, namely, when motion vector estimation is performed after separate grouping in consideration of the attribute information about the points included in the PU separately from the geometry, the range of points from the center anchor point to be included in one group may be signaled. The threshold information may be simply the number of points, or may be internally calculated in an nSigma range centered on the anchor and input and may be delivered to the decoder. It may be a predetermined value in the system that is simply a number with the concept of distance.

aps_grouping_num_points: May signal a reference value forming the basis of determining whether to perform separate motion vector estimation for each group of points classified into a group. When the number of points positioned within aps_MEME_threshold is less than aps_grouping_num_points, motion vector estimation using a search pattern may be performed.

aps_grouping_domain_flag: In grouping, the flag may signal whether the grouping is based on an attribute value or a position value of geometry. When aps_grouping_domain_flag is True, it may indicate that the search is performed based on the position of the geometry. When the flag is False, it may indicate that the grouping is performed based on an attribute value of the attribute. Conversely, the flag may signal the indication based on attribute information when it is True, and based on position information when it is False.

When sps_MotionVector_continuation_enable is True and aps_MotionVector_continuation_enable is True, related GPS parameters may be inherited in attribute motion vector estimation.

The attribute parameter set may further contain the following information aps_attr parameter_set_id identifies the APS for other DUs to reference.

aps_seq_parameter_set_id identifies the active SPS with sps_seq_parameter_set_id.

attr_coding_type specifies an attribute coding method. Valid values are specified in Table 11. Other values are reserved for future use by ISO/IEC. Decoders conforming to this version of this document may ignore (remove from the bitstream and discard) attribute data units coded with the reserved values of attr_coding_type.

attr_primary_qp_minus4 plus 4 indicates the QP for the primary attribute component before adding the per-slice, per-region, and per-transformation-level offsets.

attr_secondary_qp_offset indicates the offset to be applied to the primary attribute QP to derive the QP for the secondary attribute component.

attr_qp_offsets_present indicates that the per-slice attribute QP offset, attr_qp_offset[ ], is present (when equal to 1) or not (when equal to 0) in the ADU header.

attr_coord_conv_enabled indicates that attribute coding uses scaled angular coordinates (when equal to 1) or slice-related STV point positions (when equal to 0). It is a requirement of bitstream conformance that attr_coord_conv_enabled be 0 when geom_angular_enabled is 0. When not present, attr_coord_conv_enabled may be inferred to be 0.

attr_coord_conv_scale_bits_minus1[ ] plus 1 indicates the bit length of the syntax element attr_coord_conv_scale[ ].

attr_coord_conv_scale[ ] specifies the scale factor used to scale the-th angular coordinate of a point for attribute coding. The scale factor is in units of $2^{(-8)}$.

aps_extension_present indicates whether the syntax element aps_extension_data is present in the APS syntax structure. aps_extension_present may be 0 in bitstreams that conform to this version of this document. The value 1 for aps_extension_present is reserved for future use by ISO/IEC.

aps_extension_data may have any value.

raht_prediction_enabled indicates that the RAHT coefficients are predicted (when equal to 1) or not (when equal to 0) by upsampling and converting the previous coarse conversion level.

raht_prediction_subtree_min and raht_prediction_samples_min indicate thresholds that control the use of RAHT coefficient prediction.

raht_prediction_samples_min indicates the minimum number of spatially adjacent samples for which RAHT coefficient prediction may be performed.

raht_prediction_subtree_min indicates the minimum number of spatially adjacent samples that must be present to prevent disabling of RAHT coefficient prediction for all descendants of the RAHT node.

pred_set_size_minus1 plus 1 indicates the maximum size of the predictor set per point.

pred_inter_lod_search_range indicates the index range around the search center in which search may be performed in the extended inter-lod search for the nearest neighbor to include in the predictor set of a point.

pred_dist_bias_minus1_xyz[ ] plus 1 indicates the factor used to weight the-th XYZ component of the distance vector between two point positions used to calculate the distance between points in the predictor search for a single refinement point. The expression PredBias[ ] represents an element for the-th STV component.

$$PredBias[k]:=pred\_dist\_bias\_minus1\_xyz[StvToXyz[k]]+1$$

last_comp_pred_enabled indicates that the second coefficient component of a three-component attribute should be used to predict the value of the third coefficient component (when equal to 1) or not (when equal to 0). When not present, last_comp_pred_enabled is inferred to be 0.

lod_scalability_enabled indicates that the attribute value should be coded using constrained LoD generation and predictor search (when equal to 1) or not (when equal to 0). When equal to 1, the attribute value may be reconstructed for the partially decoded occupancy tree specified in Annex D. When not present, lod_scalability_enabled shall be inferred to be 0.

pred_max_range_minus1 plus 1, when present, indicates the distance at which point predictor candidates should be discarded during predictor set pruning for scalable attribute coding. The distance is specified in block size units per level of detail.

lod_max_levels_minus1 plus 1 indicates the maximum number of levels of detail that may be generated by the LoD generation process. When not present, lod_max_levels_minus1 is inferred to be MaxSliceDimLog2-1.

attr_canonical_order_enabled indicates that the order in which point attributes are coded is the canonical order output by the geometry decoding process specified in this document (when equal to 1) or not (when equal to 0). When not present, attr_canonical_order_enabled is inferred to be 0.

lod_decimation_mode indicates the decimation method used to generate a level of detail. Valid values are specified in Table 12. Other values are reserved for future use by ISO/IEC.

lod_sampling_period_minus2[lvl] plus 2 indicates the sampling period used in LoD generation to use sample points at level of detail lvl to generate the next coarser level of detail lvl+1.

lod_initial_dist_log 2 indicates the block size at the finest level of detail for use in LoD generation and predictor search. When not present, lod_initial_dist_log 2 is inferred to be 0.

lod_dist_log 2_offset_present specifies that the per-slice block size offset specified by lod_dist_log 2_offset should be present in the ADU header (when equal to 1) or not (when equal to 0). When not present, lod_dist_log 2_offset_present is inferred to be 0.

pred_direct_max_idx plus1 indicates the maximum number of single point predictors that may be used for direct prediction.

pred_direct_threshold indicates when a point is suitable for direct prediction. The threshold is for the maximum difference between the values of the prediction variables in the prediction variable set of the point. When the maximum difference is greater than or equal to the threshold, direct prediction is appropriate. When the attribute bit depth is greater than 8 bits, the threshold is adjusted to Exp2(AttrBitDepth −8).

pred_direct_avg_disabled indicates that the point predictor set averaging is in direct prediction mode (when equal to 0) or not (when equal to 1).

pred_intra_lod_search_range indicates the range of indexes in the refinement list of LoDs at which the nearest neighbors to be included in the predictor set of the points have been searched for.

pred_intra_min_lod indicates the finest level of detail at which intra-detail level prediction is enabled. When not present, pred_intra_min_lod is inferred to be lod_max_levels_minus1+1. It is a requirement of bitstream conformance that pred_intra_min_lod be 0 when lod_max_levels_minus1 is 0.

inter_comp_pred_enabled indicates that the first component of a multi-component attribute coefficient should be used to predict the coefficients of subsequent components (when equal to 1) or not (when equal to 0). When not present, inter_comp_pred_enabled is inferred to be 0.

pred_blending_enabled indicates that a neighbor weight used for predicting the neighbor average should be blended based on the relative spatial position of the points involved (when equal to 1) or not (when equal to 0). When not present, pred_blending_enabled is inferred to be 0.

raw_attr_width_present indicates that raw attribute values should use the same fixed-length encoding for all syntax elements (when equal to 0) or that raw attribute values should use a length per syntax element (when equal to 1).

FIG. 24 illustrates a PU structure according to embodiments.

FIG. 24 illustrates a PU structure included in the bitstream of FIG. 20.

The structure of a PU includes popul_flags, which is a flag indicating whether a point is present in the PU, a flag indicating whether the PU should be split into smaller units, MVs, which are motion vectors to be applied to the PU, and isWorld, which is a flag indicating whether the point cloud after global motion compensation should be used as a reference. When grouping points contained in a given PU based on separate attribute information, signaling may be added to indicate the number of groups, anchor information for each group, and the extent of the grouping.

FIG. 25 illustrates a point cloud data transmission device according to embodiments.

Figure 25A:
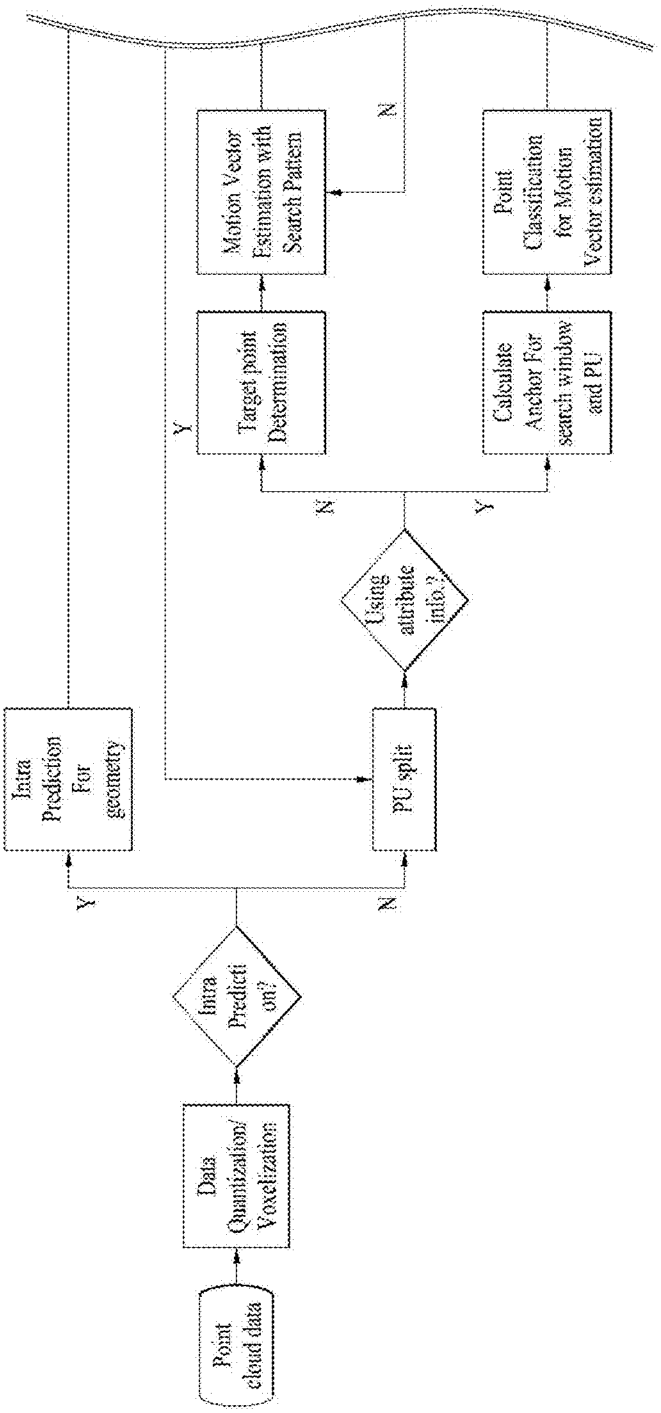
FIGS. 25A and 25B illustrate a point cloud data transmission device according to embodiments.
Figure 25B:
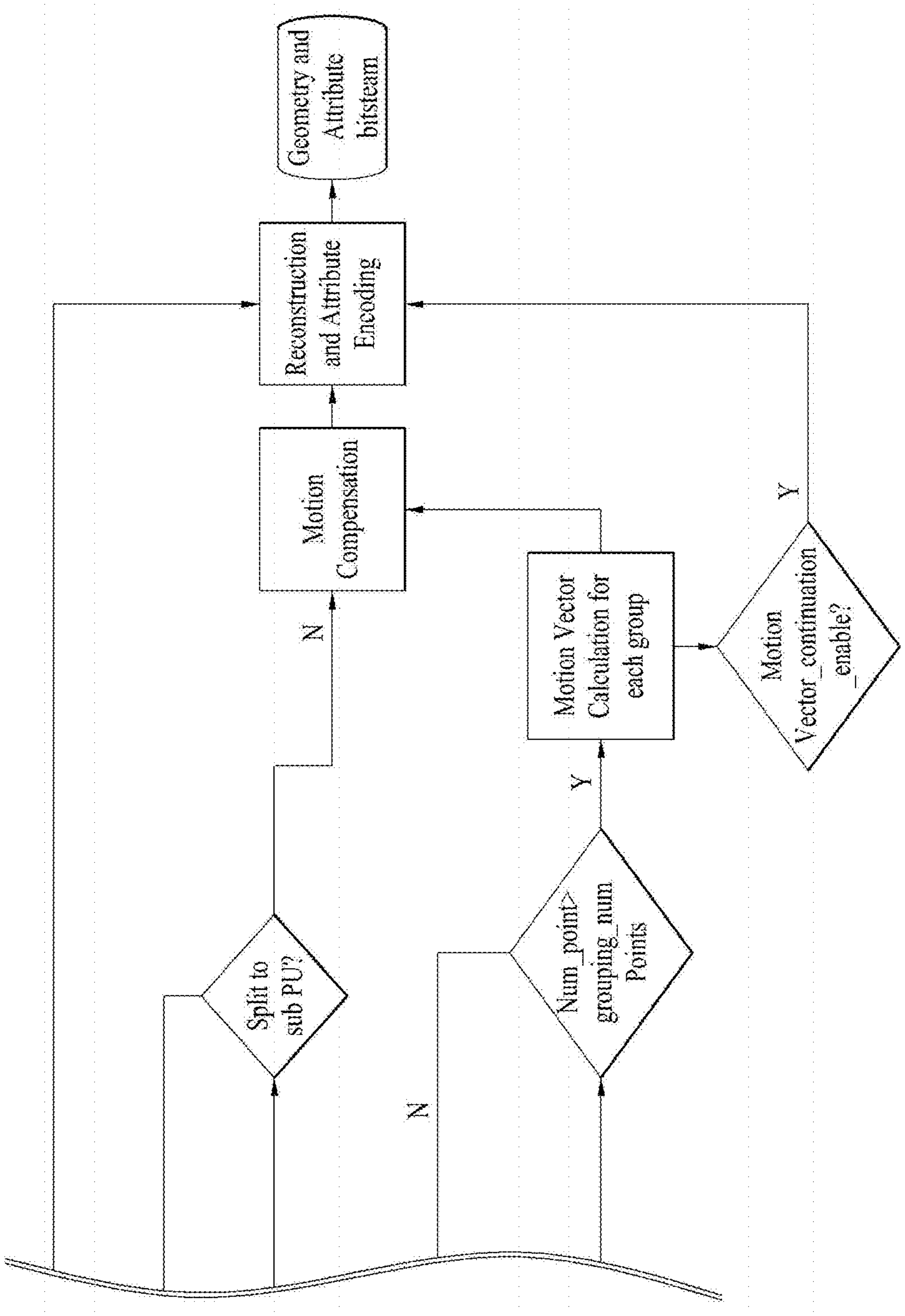

FIGS. 25A and 25B illustrate a point cloud data transmission method/device according to the embodiments (i.e., the transmission device 10000, point cloud video encoder 10002, and transmitter 10003 of FIG. 1, the acquisition 20000/encoding 20001/transmission 20002 of FIG. 2, the encoder of FIG. 4, the transmission device of FIG. 12, the device of FIG. 14, the encoding of FIGS. 15 to 19, the bitstream generation of FIGS. 20 to 24, the encoding of FIG.

25, and the transmission method of FIG. 27). Each component of the device of FIG. 25 may correspond to hardware, software, a processor, and/or a combination thereof.

An embodiment of the transmitter operation is described below. When point cloud data is input, data quantization and voxelization are performed to facilitate compression processing. After the processing, it is checked whether the point cloud data is to be processed by intra prediction. When the data is an intra prediction frame, geometry intra prediction is performed. Otherwise, the current frame is split into PUs for inter prediction. After the frame is split into PUs, points contained ni each PU component are searched for, and a window region that contains the PU region and is larger than the PU is specified in the reference frame to search for points in the window region. After the points included in each region (the PU and search window) are determined, it may be checked through a flag whether to perform motion vector estimation based on the attribute information about the points.

When the value of flag is True, the anchor of the points belonging to the PU and the window are searched for, and the points within the predefined range centered on the anchor are classified into a group. Then, when the number of points classified into the same group is greater than grouping_num_points, motion estimation is performed. When the number is less than grouping_num_points, motion vector estimation is performed using the existing search pattern.

When the value of the flag indicating whether to perform motion vector estimation based on the attribute information is False, a target point is selected and the motion vector is estimated using the search pattern. After the motion estimation is completed, the cost of splitting into sub-PUs is calculated. When the point is split into sub-PUs, the process is repeated from the PU splitting operation preceding the selection of the target point. When the point is not split, or motion vector estimation is performed after grouping based on attribute information, motion compensation is performed and a bitstream is sent through the reconstruction/attribute encoding operation. When motion vector estimation is performed after grouping points in the PU based on the attribute information, the motion vector estimation information may be passed to the attribute encoding operation. Once the attribute encoding is completed, the geometry and attribute bitstream may be sent.

A point cloud data transmission device (which may be referred to as a processor, encoder, or the like) according to embodiments may perform operations as shown in FIG. 25.

The transmission device receives point cloud data. For example, the transmission device, an encoder of the transmission device, a geometry encoder of the encoder, and/or an attribute encoder of the encoder may encode and transmit the point cloud data.

A data quantizer/voxelizer may quantize and/or voxelize the point cloud data based on quantization parameters.

The transmission device may determine whether an encoding mode of the point cloud data is intra-prediction mode. When the encoding mode is the intra-prediction mode, intra-prediction may be performed on geometry data of the point cloud data. For the geometry data contained in the current frame, a predicted value may be generated from the geometry of similar points based on a geometry tree of the current point, and a residual value may be generated to send a downsized geometry bitstream. The geometry may be reconstructed by a geometry reconstructor to encode attribute data for the geometry. The aforementioned process may be performed by the encoder, or more specifically, the geometry encoder. After encoding the geometry, the attribute encoder may encode the attribute data as described above.

When the encoding mode is not the intra-prediction mode (i.e., the mode is inter-prediction mode), the point cloud data may be split into PU units. PU stands for prediction unit. Inter-frame prediction is performed by finding similar data between the current frame and the reference frame on a per PU basis and performing motion vector estimation and motion compensation. It is checked whether geometry interpredation is based on attribute information.

When the geometry inter-prediction is not based on the attribute information, a target point is determined and motion vector estimation is performed based on a search pattern. Then, depending on whether the PU is further split into sub-PUs, the PU is split again or motion compensation is performed based on the estimated motion vector. Then, attribute encoding is performed.

When the geometry inter-prediction is based on the attribute information, an anchor for the search window and PUs is generated, and points for motion vector estimation are classified (grouped). The number of the points is configured with grouping_num_points. When number of the points is greater than grouping_num_points, a motion vector for each group is calculated. Otherwise, the motion vector is estimated based on the search pattern. Then, motion compensation is performed based on the motion vector for each group, and attribute encoding is performed. Here, when the value of the motion vector continuation enable flag is True, ME/MC may be applied continuously in attribute coding. The motion vectors is delivered to reconstruct the geometry and perform attribute encoding.

When using attributes in inter-prediction, attribute coding may be performed based on motion vectors by 1) finding an anchor, 2) classifying points based on the anchor, 3) estimating motion vectors on the classified points, 4) performing motion compensation with the motion vectors for each group, and 4) determining whether to use the motion vectors for attribute coding.

FIG. 26 illustrates a point cloud data reception device according to embodiments.

FIG. 26 illustrates a point cloud data reception method/device according to the embodiments (i.e., the reception device 10004, receiver 10005, and point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoding of FIGS. 15 to 19, the bitstream parsing of FIGS. 20 to 24, the encoding of FIG. 26, and a the reception method of FIG. 28). Each component of the device of FIG. 26 may correspond to hardware, software, a processor, and/or a combination thereof. The reception device of FIG. 26 may reversely perform each of the operations of the transmission device of FIG. 25.

The receiver (which may be referred to as a reception device, decoder, processor, etc.) performs entropy decoding, dequantization, and inverse transformation on the received bitstream to reconstruct the original point cloud with a residual, which is the prediction error for each point. When the frame is a frame for intra prediction, the geometry information about the point cloud is updated after applying the intra prediction method. Otherwise, it is checked whether a PU needs to be split. When the PU needs to be split, the PU is further split and then it is checked whether additional splitting is performed for each sub-PU. When the value of the split flag is False, the motion vector of the PU is decoded. When the PU is not split, a flag indicating whether grouping is to be performed according to the attribute information about the points in the search window. Then, if grouping has been performed according to the attribute information, the points in the PU are grouped based on the decoded anchor and threshold information, and motion vector compensation is performed. When the value of the flag is False, the motion vector is compensated for all points in the PU and the point cloud is updated. When the motion vector information delivered for each PU is used for motion vector compensation of an attribute during attribute decoding, all or part of the motion vectors of geometry may be delivered to the attribute decoder. Once the geometry is fully reconstructed, the attribute information is decoded to include attribute information at the corresponding positions, and the reconstructed point cloud contents are delivered to a renderer.

A point cloud data reception device, a decoder, a geometry decoder of the decoder, an attribute decoder of the decoder, and a processor according to embodiments may decode point cloud data, as shown in FIG. 26.

A bitstream may be received to perform entropy decoding.

The point cloud data may be inversely quantized. A reverse process to the quantization on the transmitting side may be performed.

The coordinate system for the point cloud data is inversely transformed. The reverse process to the transformation of the coordinate system on the transmitting side may be performed.

It is checked whether the decoding mode for the point cloud data is intra-prediction.

When the decoding mode is the intra-prediction, intra-frame decoding may be performed. Then, the point cloud may be updated and the point cloud geometry may be reconstructed to perform attribute decoding.

When the decoding mode is not the intra-prediction, the point cloud data may be split. The splitting may be performed on a per PU basis.

Motion vectors related to the point cloud data for inter-prediction may be decoded.

It is checked whether to perform inter-geometry prediction based on attribute information.

When inter-prediction is performed based on the attribute information, points may be classified based on the threshold and anchor, just like on the transmitting side.

Motion compensation may be performed based on the motion vectors.

After the motion compensation, the point cloud data may be updated, and the point cloud geometry may be reconstructed to perform attribute decoding.

In some embodiments, the value of the motion vector continuation enable flag is True, motion vectors may be used continuously in attribute decoding.

As such, attribute information about the points being predicted may be considered for inter-frame motion prediction of point cloud contents according to embodiments. The encoder may group related points in each region of the PU and search window to perform abortion prediction, thereby reducing additional splitting of prediction units and improving accuracy. In addition, by considering attribute information as well, a group of classified points may become an object unit, which may be used for object-based motion vector estimation/compensation. The decoder may similarly require a smaller extent of splitting and may use the motion vectors of the geometry for motion estimation of the attribute information, thereby reducing the bitstream size and decoding time.

The processes of the transmission device and the reception device according to the embodiments may be combined with the point cloud compression described herein. Additionally, the operations according to the embodiments described herein may be performed by a transmission/reception device including a memory and/or a processor, depending on the embodiments. The memory may store programs for processing/controlling the operations according to the embodiments, and the processor may control the various operations described herein. The processor may be referred to as a controller or the like. The operations according to the embodiments may be performed by firmware, software, and/or combinations thereof, and the firmware, software, and/or combinations thereof may be stored on the processor or stored in the memory.

FIG. 27 illustrates a point cloud data transmission method according to embodiments.

A method of transmitting point cloud data according to embodiments may include encoding point cloud data (S2700).

The encoding operation according to the embodiments may include the operations of the transmission device 10000 of FIG. 1, the point cloud video encoder 10002, the encoding 20001, the encoder of FIG. 4, the transmission device of FIG. 12, the XR device 1430 of FIG. 14, the encoding according to FIGS. 15 to 19, the generation of a bitstream and parameters of FIGS. 20 to 24, and the encoding of FIG. 25.

The method of transmitting point cloud data according to the embodiments may further include transmitting a bitstream containing the point cloud data (S2701).

The transmitting operation according to the embodiments may include the operations of the transmission device of FIG. 1, the transmitter 10003, the transmission 20002, the transmission of encoded point cloud data according to FIGS. 15 to 19, the generation and transmission of a bitstream and parameters of FIGS. 20 to 24, and the encoding and transmission of FIG. 25.

FIG. 28 illustrates a point cloud data reception method according to embodiments.

A method of receiving point cloud data according to the embodiments may include receiving a bitstream containing point cloud data (S2800).

The receiving operation according to the embodiments may include the operations of the reception device 10004 of FIG. 1, the receiver 10005, the transmission 20002, and the reception of a bitstream and parameters of FIGS. 20 to 24.

The method of receiving point cloud data according to the embodiments may further include decoding the point cloud data (S2801).

The decoding operation according to the embodiments may include the operations of the point cloud video decoder 10006, the decoding 20003, the decoder of FIGS. 10 and 11, the reception device of FIG. 13, the XR device 1430 of FIG. 14, the decoding according to FIGS. 15 to 19, the parsing of the bitstream and parameters of FIGS. 20 to 24, and the decoding of FIG. 26.

Referring to FIG. 1, a method of transmitting point cloud data according to embodiments may include encoding point cloud data, and transmitting a bitstream containing the point cloud data.

Referring to FIG. 15, a process of prediction unit (PU)-based encoding (inter-prediction) may be performed as follows. For example, the encoding of the point cloud data may include encoding geometry data of the point cloud data, and encoding attribute data of the point cloud data, wherein the point cloud data may be encoded based on a PU.

Referring to FIG. 16, regarding attribute-based point grouping and anchor selection, the encoding of the point cloud data may further include grouping points included in the PU based on the attribute data, wherein the points included in the PU may be classified based on the attribute data for the points, and an anchor may be generated.

Referring to FIG. 17, regarding attribute range-based grouping and geometry range-based grouping, the grouping may include, based on the anchor, grouping points in a range related to the attribute data about the points, or, based on the anchor, grouping points in a range related to the geometry data about the points.

Referring to FIG. 18, regarding attribute-based per-group or per-PU MVE, the encoding of the point cloud data may include estimating a motion vector for the group based on the number of grouped points, or estimating a motion vector for the PU based on the number of grouped points.

Referring to FIG. 19, regarding the attribute range-based grouping and the geometry range-based grouping, the grouping may include generating a group based on a threshold for the attribute data about the points, or generating a group based on a threshold for the geometry data about the points, wherein the points classified based on the attribute data may be included in the group based on the anchor and the threshold.

Referring to FIG. 20, regarding the bitstream, the bitstream may contain parameters for motion estimation and motion compensation related to the attribute data. For specific syntaxes and semantics, reference may be made to the descriptions given above.

Referring to FIG. 25, regarding the flowchart for encoding performed by a device and a processor, the encoding of the point cloud data may include quantizing the point cloud data, voxelizing the point cloud data, splitting the point cloud data based on PUs, and classifying points in the point cloud data based on the attribute data of the point cloud data, generating an anchor for the points, classifying points for motion vector estimation based on the anchor, the classified points being included in a group, generating a motion vector for the group, performing motion compensation based on the motion vector, and encoding the attribute data of the point cloud data based on the motion vector.

The point cloud data transmission method according to the embodiments is carried out by a transmission device. The transmission device may include an encoder configured to encode point cloud data; and a transmitter configured to transmit a bitstream containing the point cloud data. The transmission device may include a memory and a processor.

The point cloud data reception method according to the embodiments may perform a corresponding or reverse process to the transmission method. For example, it may include receiving a bitstream containing point cloud data, and decoding the point cloud data.

The decoding of the point cloud data may include decoding geometry data of the point cloud data, and decoding attribute data of the point cloud data, wherein the point cloud data may be decoded based on a prediction unit.

The decoding of the point cloud data may further include, based on the attribute data, grouping points included in the prediction unit, wherein the points included in the prediction unit may be classified based on the attribute data about the points, and an anchor may be generated. The prediction unit may be referred to as a PU. The grouping of the points means classifying the points into groups of points that are efficient for encoding/decoding according to specific criteria and methods.

The grouping may include, based on the anchor, grouping points in a range related to the attribute data about the points, or, based on the anchor, grouping points in a range related to the geometry data about the points.

Referring to FIG. 26, regarding the decoding process performed by the device or processor, the decoding of the point cloud data include entropy decoding the bitstream; dequantizing the point cloud data, inversely transforming coordinates of the point cloud data; and splitting the point cloud data based on a PU, decoding a motion vector for the point cloud data, classifying the points of the point cloud data based on an anchor and a threshold for the point cloud data using the attribute data of the point cloud data, and performing motion compensation on the classified points.

The point cloud data reception method may be carried out by a reception device. The reception device may include a memory and/or a processor. The reception device may include a receiver configured to receive a bitstream containing the point cloud data, and a decoder configured to decode the point cloud data.

The encoding and decoding methods according to the embodiments employ octree (or general tree) geometry coding-based PUs to perform local motion estimation. Rather than generating a uniformly distributed unit vector as a search pattern and repeatedly using a fixed search pattern for all PUs to perform motion vector estimation, embodiments may perform motion vector estimation and motion compensation by grouping position information (geometry data) about the points in the same PU based on the attribute information (attribute data) and comparing the grouped information (points) with corresponding information (points) in a reference frame related to the grouped information (points). Thereby, the embodiments may effectively reduce the encoding and decoding time compared to the method using a fixed search pattern. In other words, embodiments may use not only the position information about the points for local motion estimation but also attribute information to classify points that are highly related to each other, and efficiently perform motion vector estimation and compensation based on the classified information. In addition, since geometry and attributes are considered together in classifying points and estimating motion vectors, the prediction accuracy and performance may be increased. Therefore, the technical issues and limitations of local motion estimation may be effectively addressed. In estimating a global motion vector, the embodiments do not simply separate objects and roads contained in the point cloud contents to perform local motion estimation. The embodiments may split PUs and generate point groups considering geometry and attributes to perform motion estimation. While the inter-frame coding scheme may also consider geometry and attributes, embodiments may further provide grouping points according to position information within the same PU based on the attribute information to perform motion estimation and motion compensation. As described above, the criteria and/or method for grouping points may be varied.

The technical challenge is to accurately perform motion estimation by grouping related points within each region of the PU and search window. Even when attributes of different objects are present in the same PU, embodiments may address the issue of decrease in accuracy of the attribute prediction by considering attribute information. To this end, points may be classified and grouped to provide the effect of making predictions between points that belong to the same PU and the same object.

The method applied to perform motion estimation in EM (inter prediction) technology is to find the best motion vector that should be added to become the point of the current frame from the vector difference of the point that is the target of motion estimation from the vector difference of the point in the presence of an LUT consisting of unit vectors in different directions, and then perform motion compensation with the best motion vector. In this method, the motion vector may be found by iteratively making changes as much as the amount of motion applied in a predetermined search direction. However, G-PCC includes all points in the PU for motion vector estimation without reflecting the data distribution in performing ME/MC. When the difference between the points included in the search window and the PU is excessively large, the points are excluded from ME/MC. However, geometry and attribute information are separated and processed as separate information. Accordingly, even if points belong to the same PU when only geometry is considered, but the attribute information is completely different, the motion vector is searched for considering only the distance based on the same PU unit. Thus, in a situation where multiple points constituting an object are considered, there may be different pieces of object information. In this case, objects exhibiting different motions may be considered as one unit (prediction unit) for motion vector estimation, which may reduce the accuracy of inter prediction.

Embodiments may perform motion vector estimation considering geometry and attributes.

Furthermore, the attribute information in the reference frame may be used to remove outliers from the candidates for motion vector estimation or to process the same separately.

In addition, the motion vector information found in geometry may be inherited in attribute coding.

In addition, the points of PUs that have been primarily classified based on the geometry may be separated by attribute information.

Further, outliers may be removed or an existing method may be applied when the number of points less than or equal to a specific value in the same PU has different attribute information than the majority of points.

The attribute information may be included as the same object or PU information only when it has the same value or a difference less than or equal to a specific value.

When the result of the classification of points by attribute information is little different from the result of the classification by geometry, or when the number of points classified by attribute information is less than a predetermined number, the search pattern-based method may be applied.

Therefore, the encoder may perform motion prediction by grouping related points based on attribute information among the points included in each region of the PU and search window, which may reduce the process of additional splitting of PUs, improve accuracy, and enable a group of classified points to become an object unit, such that the group may be used for object-based motion vector estimation/compensation. Similarly, the decoder may reduce the splitting process and utilize the motion vector of the geometry for motion estimation of attribute information, which may reduce the bitstream size and decoding time.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms “a”, “an”, and “the” include plural referents unless the context clearly dictates otherwise. The expression “and/or” is used to include all possible combinations of terms. The terms such as “includes” or “has” are intended to indicate existence of figures, numbers, steps, elements, and/or components and should be understood as not precluding possibility of existence of additional existence of figures, numbers, steps, elements, and/or components. As used herein, conditional expressions such as “if” and “when” are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

As described above, related contents have been described in the best mode for carrying out the embodiments.

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method of encoding point cloud data, the method comprising:

encoding geometry data of point cloud data;

encoding attribute data of the point cloud data based on a reference frame for the point cloud data, wherein the attribute data is predicted by referencing a point in the reference frame based on a position for the attribute data and a range related to the attribute data, wherein the geometry data and the attribute data are included in a bitstream, wherein the bitstream includes a flag for specifying whether the attribute data is coded based on coordinates for geometry data of the point cloud data or the attribute data is coded based on coordinates for the attribute data.

2. The method of claim 1, wherein the point cloud data is encoded based on a prediction unit.

3. The method of claim 2, wherein the encoding of the point cloud data further comprises:

grouping points included in the prediction unit based on the attribute data, wherein the points included in the prediction unit are classified based on the attribute data about the points, and an anchor is generated.

4. The method of claim 3, wherein the grouping comprises:

grouping points included in a range related to the attribute data about the points based on the anchor; or grouping points included in a range related to the geometry data about the points based on the anchor.

5. The method of claim 4, wherein the encoding of the point cloud data comprises:

estimating a motion vector for a group based on the number of the grouped points; or estimating a motion vector for the prediction unit based on the number of the grouped points.

6. The method of claim 4, wherein the grouping comprises:

generating a group based on a threshold for the attribute data about the points; or generating a group based on a threshold for the geometry data about the points, wherein the points classified based on the attribute data are included in the group based on the anchor and the threshold.

7. The method of claim 1, wherein the encoding of the point cloud data comprises:

quantizing the point cloud data, voxelizing the point cloud data;

splitting the point cloud data based on a prediction unit;

classifying points of the point cloud data based on attribute data of the point cloud data and generating an anchor for the points;

classifying, based on the anchor, points for motion vector estimation, the classified points being included in a group;

generating a motion vector for the group and performing motion compensation based on the motion vector; and encoding the attribute data of the point cloud data based on the motion vector.

8. A device for encoding point cloud data, the device comprising:

a memory; and at least one processor connected to the memory, the at least one processor configured to:

encode geometry data of point cloud data;

encode attribute data of the point cloud data based on a reference frame for the point cloud data, wherein the attribute data is predicted by referencing a point in the reference frame based on a position for the attribute data and a range related to the attribute data, wherein the geometry data and the attribute data are included in a bitstream, wherein the bitstream includes a flag for specifying whether the attribute data is coded based on coordinates for geometry data of the point cloud data or the attribute data is coded based on coordinates for the attribute data.

9. A method of decoding point cloud data, the method comprising:

decoding geometry data of point cloud data in a bitstream;

decoding attribute data of the point cloud data based on a reference frame for the point cloud data, wherein the attribute data is predicted by referencing a point in the reference frame based on a position for the attribute data and a range related to the attribute data, wherein the bitstream includes a flag for specifying whether the attribute data is coded based on coordinates for geometry data of the point cloud data or the attribute data is coded based on coordinates for the attribute data.

10. The method of claim 9, wherein the point cloud data is decoded based on a prediction unit.

11. The method of claim 10, wherein the decoding of the point cloud data further comprises:

grouping points included in the prediction unit based on the attribute data, wherein the points included in the prediction unit are classified based on the attribute data about the points, and an anchor is generated.

12. The method of claim 11, wherein the grouping comprises:

grouping points included in a range related to the attribute data about the points based on the anchor; or grouping points included in a range related to the geometry data about the points based on the anchor.

13. The method of claim 9, wherein the decoding of the point cloud data comprises:

entropy-decoding the bitstream;

dequantizing the point cloud data;

inversely transforming coordinates of the point cloud data;

splitting the point cloud data based on a prediction unit;

decoding a motion vector for the point cloud data;

classifying points of the point cloud data based on an anchor and a threshold for the point cloud data based on attribute data of the point cloud data, and performing motion compensation on the classified points.

14. A device for decoding point cloud data, the device comprising:

a memory; and at least one processor connected to the memory, the at least one processor configured to:

decode geometry data of point cloud data in a bistream;

decode attribute data of the point cloud data based on a reference frame for the point cloud data, wherein the attribute data is predicted by referencing a point in the reference frame based on a position for the attribute data and a range related to the attribute data, wherein the bitstream includes a flag for specifying whether the attribute data is coded based on coordinates for geometry data of the point cloud data or the attribute data is coded based on coordinates for the attribute data.

* * * * *